(12) United States Patent
Mochizuki et al.

(10) Patent No.: US 6,573,842 B2
(45) Date of Patent: Jun. 3, 2003

(54) MAP DISPLAY DEVICE, MAP DISPLAY METHOD, AND COMPUTER PROGRAM FOR USE IN MAP DISPLAY DEVICE

(75) Inventors: Yoshiyuki Mochizuki, Suita (JP); Keiichi Senda, Takarazuka (JP)

(73) Assignee: Matsushita Electric Industrial Co., Ltd., Osaka-Fu (JP)

( * ) Notice: Subject to any disclaimer, the term of this patent is extended or adjusted under 35 U.S.C. 154(b) by 0 days.

(21) Appl. No.: 09/962,723

(22) Filed: Sep. 25, 2001

(65) Prior Publication Data

US 2002/0042674 A1 Apr. 11, 2002

(30) Foreign Application Priority Data

Oct. 6, 2000 (JP) ........................................ 2000-308483

(51) Int. Cl.⁷ ............................................... G08G 1/123
(52) U.S. Cl. ...................... 340/995; 340/990; 701/200; 701/214
(58) Field of Search ................................. 340/995, 988, 340/990, 961; 701/200, 208, 210, 212, 214

(56) References Cited

U.S. PATENT DOCUMENTS

| | | | | |
|---|---|---|---|---|
| 4,543,572 A | * | 9/1985 | Tanaka et al. | 701/201 |
| 4,608,656 A | * | 8/1986 | Tanaka et al. | 701/212 |
| 5,398,188 A | * | 3/1995 | Maruyama | 701/208 |
| 6,141,014 A | * | 10/2000 | Endo et al. | 345/427 |
| 6,154,151 A | * | 11/2000 | McElreath et al. | 340/970 |
| 6,356,835 B2 | * | 3/2002 | Hayashi et al. | 701/208 |

FOREIGN PATENT DOCUMENTS

JP          11-161159         6/1999

* cited by examiner

*Primary Examiner*—Toan N Pham

(57) ABSTRACT

When a user indicates a portion of a map to be enlarged or contracted, a surface generating unit generates surfaces by gradually changing a surface from a first shape to a second shape, the first shape corresponding to a position of a map portion previously indicated and the second shape corresponding to a position of the map portion currently indicated. A mapping unit maps the map onto the generated surfaces in sequence, to obtain mapped images. A projecting/displaying unit sequentially projects the mapped images onto a flat virtual screen, and displays the projected images. Thus, the desired portion of the map can be enlarged/contracted, while maintaining connections of roads. Also, the map display can be transformed smoothly, even when the target of enlargement/contraction changes from one map portion to another according to the user's indications. This helps the user comprehend the contents of the map quickly and accurately.

21 Claims, 38 Drawing Sheets

FIG. 3

| CHARACTER | CHARACTER POSITION |
|---|---|
| R512 | (300, 300) |
| SHRINE A | (400, 400) |
| CASTLE B | (750, 100) |

| SURFACE DEFINITION INFORMATION | ENLARGED/ CONTRACTED PORTION |
|---|---|
| $x^2+(y-0.5)^2+(z+1)^2=1.25$ | ENLARGED |
| $x^2+(y-0.5)^2+(z-1)^2=1.25$ | ENLARGED |
| $z=0$ | UNDESIGNATED |
| $x^2+(y-0.5)^2+(z+1)^2=1.25$ | CONTRACTED |

FIG. 6

| PREVIOUS POINT OF INTEREST | CURRENT POINT OF INTEREST |
|---|---|
| UNDESIGNATED |  |
| — | ENLARGED |

FIG. 8

CAR POSITIONAL INFORMATION ~156

| POSITION | DIRECTION |
|----------|-----------|
| (300, 300) | 45 |

FIG.19

ALTITUDE TABLE

| POSITION | ALTITUDE |
|---|---|
| (100, 100) | 290 |
| (100, 200) | 300 |

121

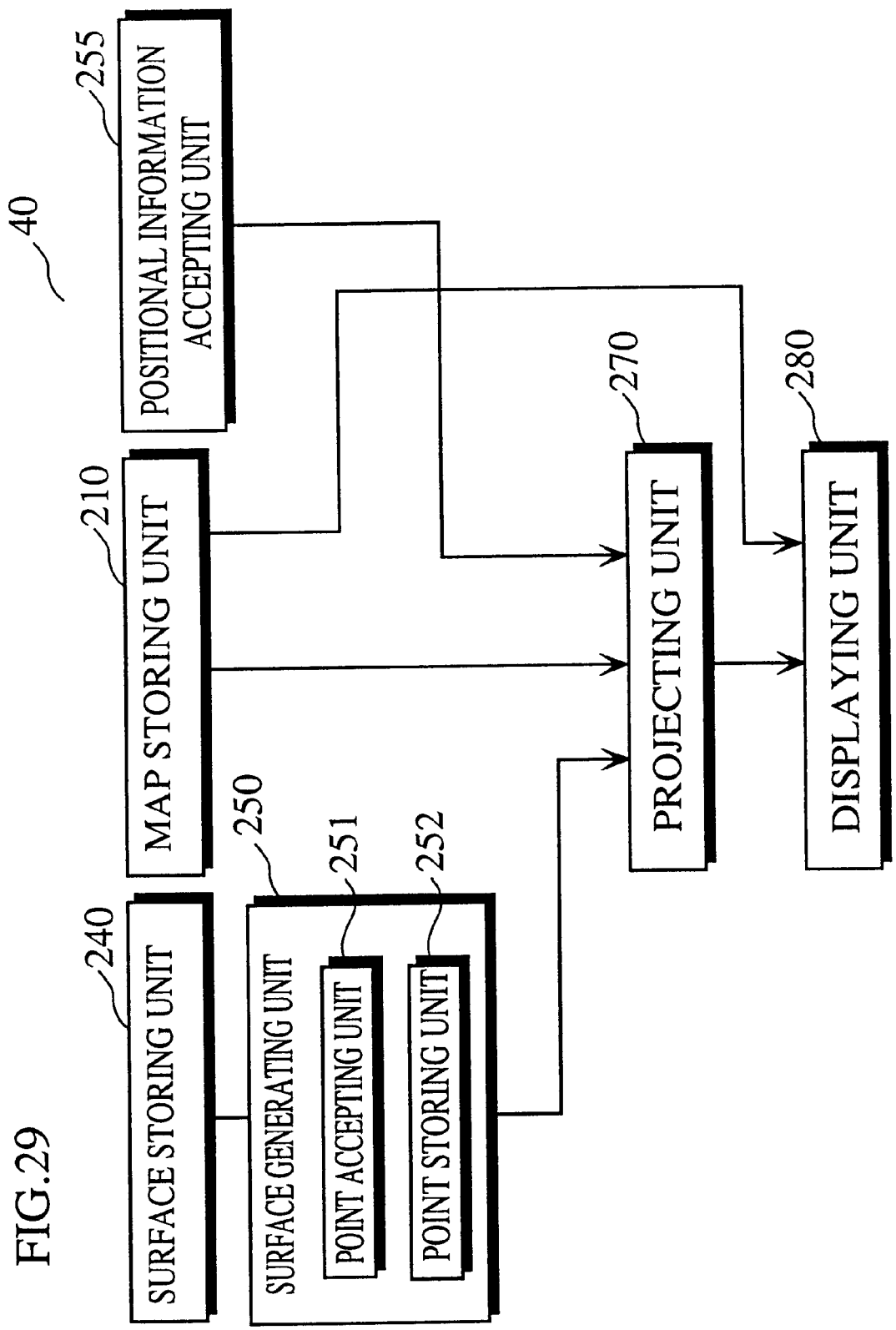

MAP DISPLAY DEVICE, MAP DISPLAY METHOD, AND COMPUTER PROGRAM FOR USE IN MAP DISPLAY DEVICE

This application is based on application No. 2000-308483 filed in Japan, the content of which is hereby incorporated by reference.

BACKGROUND OF THE INVENTION

1. Field of the Invention

The present invention relates to a map display device, a map display method, and a computer program for use in a map display device. The invention in particular relates to road map display techniques used in car navigation devices.

2. Related Art

Example applications for map display devices include a car navigation device. A map display device used in a car navigation device needs to enable a user, i.e. a driver, to comprehend a displayed map at a glance. Hence various map display techniques have been devised so that the driver can understand displayed information at once. One of such techniques is a method of emphasizing information which is likely to be desired by the driver.

When driving a car, there are some points to which the driver seems to pay particular attention, such as an intersection and a destination location. Such points are hereinafter called "points of interest". A conventional type of map display device displays an enlarged view of a point of interest and its vicinity. For example, when a car is approaching a main intersection, this type of map display device displays an enlarged view of the intersection and its vicinity, to help the driver decide which route he or she should take. Here, the enlarged view may be displayed not on the whole screen but over a part of the screen so as to partially overlap the map which is being displayed on the screen.

Another type of map display device displays, over a part of a map which is being displayed on a screen, a wide area view of the periphery of an area covered by the map, on a smaller scale. This method allows the driver to consult the map, and at the same time consult the wide area view to check which roads exist around the area covered by the map.

Thus, conventional map display devices emphasize information which is likely to be desired by the driver, by displaying an enlarged view of the vicinity of a point of interest or a wide area view of the periphery of an area shown by a map. In this way, the driver can quickly comprehend information displayed on the screen.

However, when the enlarged view of the vicinity of the point of interest is displayed on the whole screen, the driver can view the enlarged view but cannot view the map of the area outside the vicinity of the point of interest, and therefore cannot check the roads existing around the vicinity of the point of interest.

Also, when the enlarged view of the vicinity of the point of interest or the wide area view of the periphery of the area covered by the map is displayed on part of the screen, the driver cannot view the part of the map which is concealed by this display. Besides, there is no continuity between the map and the enlarged or wide area view whose scale is different with the map. This makes it difficult for the driver to quickly comprehend the relation between the two maps displayed on the screen, in particular the connections of roads between these maps.

Also, the driver may lose sight of the point of interest, when moving his or her eyes between the map and the enlarged or wide area view.

There is also a conventional technique of displaying a map using the law of perspective. This method displays distant objects to be small and close objects to be large in accordance with human visual characteristics, thereby helping the driver view the map in the right perspective. However, when displaying the vicinity of the point of interest in enlarged view or the periphery of the area in wide area view, this technique has the same problem as above.

SUMMARY OF THE INVENTION

In view of the above problems, the present invention aims to provide a map display device that enables a driver to quickly and accurately comprehend the contents of a map displayed on a display screen.

(1) The stated object can be achieved by a map display device characterized by (a) generating surfaces with different shapes which are obtained in a process of gradually changing a curvature of a surface with time, (b) transforming first coordinate information that relates to a map, to second coordinate information on each of the generated surfaces, and (c) displaying the map in accordance with the second coordinate information on each of the generated surfaces.

According to this construction, the map can be displayed with a desired portion gradually enlarged or contracted, while maintaining connections of roads. For instance, it is possible to enlarge a point of interest and its vicinity on a map which the driver wants to consult closely, and at the same time contract the periphery of an area covered by the map so that the periphery is displayed in wide area view. As a result, the connections of roads are maintained, and the driver can accurately and quickly comprehend the contents of the map displayed on the display screen. Also, the map is displayed with its shape being changed gradually from one shape to another. This enables the map display to be transformed smoothly, even when the target of enlargement/contraction switches from one map portion to another. Hence the driver will not lose sight of the point of interest he or she is paying attention to on the map.

(2) The map display device of (1) may include: a map storing unit for storing the first coordinate information, the first coordinate information showing positions of objects in the map; a surface generating unit for generating the surfaces which are obtained in a process of gradually deforming the surface from a first shape to a second shape, the generated surfaces including (a) intermediate surfaces that each have an intermediate shape between the first shape and the second shape and (b) a surface that has the second shape; a mapping unit for (a) transforming the first coordinate information to the second coordinate information on each of the generated surfaces, and (b) texture-mapping graphics that represent the objects onto each of the generated surfaces with reference to positions shown by the second coordinate information, to obtain mapped images corresponding to the generated surfaces; and a projecting/displaying unit for perspective-projecting the mapped images sequentially onto a flat virtual screen to obtain projected images, and displaying the projected images in sequence.

(3) In the map display device of (2), the first shape and the second shape may be (a) a flat surface and a curved surface, (b) a curved surface and a flat surface, or (c) two curved surfaces.

According to these constructions, the mapped images on the generated surfaces are perspective-projected on the flat virtual screen. As a result, each projected image is displayed with an enlarged or contracted portion, unlike the case where the map is simply perspective-projected onto the flat virtual screen. Also, since the shapes of the generated surfaces are spatially continuous, the connections of roads are maintained through the projected images. With these features, the map display device produces the above effects.

(4) In the map display device of (2), a portion of the map that includes a point of interest may need to be enlarged or contracted gradually with time, wherein the surface generating unit (a) generates, when the portion needs to be enlarged, the surfaces where the second shape is defined such that: an angle formed between a part of the surface with the second shape to which graphics which represent objects included in the portion are texture-mapped and a line of sight directed to the part of the surface in the perspective projection is larger than any angles formed between other parts of the surface and lines of sight directed to the other parts of the surface in the perspective projection, and (b) generates, when the portion should be contracted, the surfaces where the second shape is defined such that: an angle formed between a part of the surface with the second shape to which graphics which represent objects included in the portion are texture-mapped and a line of sight directed to the part of the surface in the perspective projection is smaller than any angles formed between other parts of the surface and lines of sight directed to the other parts of the surface in the perspective projection.

(5) In the map display device of (4), the surface generating unit may include: a point accepting unit for accepting an indication of a position of the point of interest and an indication regarding whether the portion including the point of interest should be enlarged or contracted, from a user, wherein the surface generating unit generates the surfaces in accordance with the accepted indications.

According to these constructions, when the driver indicates the position of the point of interest, the map portion including the point of interest is enlarged or contracted gradually. For instance, by indicating an intersection to be enlarged gradually, the driver can view the intersection and its vicinity closely. Also, by indicating the periphery of the map to be contracted gradually, the driver can view the periphery in wide area view. The display is transformed gradually in both cases, so that the driver will not lose sight of the point of interest he or she is paying attention to on the map.

(6) The map display device of (5) may further include: an altitude storing unit for storing altitude information showing a correspondence between positions of points in the map and altitudes of the points, wherein the mapping unit includes: a surface deforming unit for (a) transforming the positions shown by the altitude information to positions on each of the generated surfaces, and (b) providing undulations corresponding to the altitudes shown by the altitude information, to each of the generated surfaces at the transformed positions, to generate deformed surfaces, and the mapping unit transforms the first coordinate information to the second coordinate information on each of the deformed surfaces.

According to this construction, the map display device displays the map of three-dimensional appearance in accordance with the altitudes, so that the map which delivers the same degree of realism as the view when looking at the actual terrain from the sky can be presented to the driver. Thus, in addition to the above effects, the driver's understanding of the topography is facilitated.

(7) In the map display device of (6), the surface deforming unit may include: an altitude changing unit for changing altitudes in the altitude information that correspond to positions which belong to a first area in the map, to a uniform value, the first area being made up of a current position of the map display device and a neighborhood thereof, wherein the surface deforming unit generates the deformed surfaces using the changed altitude information.

According to this construction, the map display device displays the vicinity of the car position flatly and the other area three-dimensionally. Accordingly, in addition to the above effects, the display of the vicinity of the car position is kept from being obstructed by undulations.

(8) In the map display device of (7), the altitude changing unit may further change altitudes in the altitude information that correspond to positions which belong to an area around the first area in the map, in accordance with distances of the positions from the first area.

According to this construction, the boundary area between the flatly displayed area and the three-dimensionally displayed area is displayed so that the flat area and the three-dimensional area show continuity. Accordingly, in addition to the above effects, unnaturalness in visuality is reduced.

(9) In the map display device of (2), when sequentially displaying the projected images, the projecting/displaying unit may also display character strings that show the objects, with reference to display positions of the graphics that represent the objects.

According to this construction, the map display device does not subject character fonts to texture mapping and perspective projection, but directly displays the character fonts at the corresponding position on the display screen. As a result, the deformation of the character fonts due to texture mapping and perspective projection is avoided, with it being possible to increase the character viewability.

(10) The map display device of (1) may include: a map storing unit for storing the first coordinate information, the first coordinate information showing positions of objects in the map; a surface generating unit for generating the surfaces which are obtained in a process of gradually deforming the surface from a first shape to a second shape, the generated surfaces including (a) intermediate surfaces that each have an intermediate shape between the first shape and the second shape and (b) a surface that has the second shape; and a projecting/displaying unit for (a) transforming the first coordinate information to the second coordinate information on each of the generated surfaces, (b) perspective-projecting graphics that represent the objects onto each of the generated surfaces which serve as virtual screens with reference to positions shown by the second coordinate information, to obtain projected images corresponding to the generated surfaces, and (c) displaying the projected images in sequence.

(11) In the map display device of (10), the first shape and the second shape may be (a) a flat surface and a curved surface, (b) a curved surface and a flat surface, or (c) two curved surfaces.

According to these constructions, the map is perspective-projected onto the generated surfaces. As a result, each projected image is displayed with an enlarged or contracted portion, unlike the case where the map is simply perspective-projected onto a flat virtual screen. Also, since the shapes of these generated surfaces are spatially continuous, the connections of roads are maintained through the projected images. Hence the above effects are achieved.

(12) In the map display device of (10), a portion of the map that includes a point of interest may need to be enlarged or contracted gradually with time, wherein the surface generating unit (a) generates, when the portion needs to be enlarged, the surfaces where the second shape is defined such that: an angle formed between a part of the surface with the second shape to which graphics which represent objects included in the portion are perspective-projected and a line of sight directed to the part of the surface in the perspective projection is smaller than any angles formed between other parts of the surface and lines of sight directed to the other parts of the surface in the perspective projection, and (b) generates, when the portion needs to be contracted, the surfaces where the second shape is defined such that: an angle formed between a part of the surface with the second shape to which graphics which represent objects included in the portion are perspective-projected and a line of sight directed to the part of the surface in the perspective projection is larger than any angles formed between other parts of the surface and lines of sight directed to the other parts of the surface in the perspective projection.

(13) In the map display device of (12), the surface generating unit may include: a point accepting unit for accepting an indication of a position of the point of interest and an indication regarding whether the portion including the point of interest should be enlarged or contracted, from a user, wherein the surface generating unit generates the surfaces in accordance with the accepted indications.

According to these constructions, when the driver indicates the position of the point of interest, the map portion including the point of interest is gradually enlarged or contracted. For instance, by indicating an intersection to be enlarged gradually, the driver can view the intersection and its vicinity closely. Also, by indicating the periphery of the map to be contracted gradually, the driver can view the periphery in wide area view. The display is transformed gradually in both cases, so that the driver will not lose sight of the point of interest he or she is paying attention to on the map.

(14) The map display device of (13) may further include: an altitude storing unit for storing altitude information showing a correspondence between positions of points in the map and altitudes of the points, wherein the projecting/displaying unit includes: a map deforming unit for (a) calculating altitudes at the positions shown by the first coordinate information, based on the altitude information, and (b) changing the first coordinate information according to the calculated altitudes, and the projecting/displaying unit transforms the changed first coordinate information to the second coordinate information on each of the generated surfaces.

According to this construction, the map display device displays the map of three-dimensional appearance in accordance with the altitudes, so that the map which delivers the same degree of realism as the view when looking at the actual terrain from the sky can be presented to the driver. Thus, in addition to the above effects, the driver's understanding of the topography is facilitated.

(15) In the map display device of (14), the map deforming unit may include: an altitude changing unit for changing altitudes shown by the altitude information that correspond to positions which belong to a first area in the map, to a uniform value, the first area being made up of a current position of the map display device and a neighborhood thereof, wherein the map deforming unit changes the first coordinate information in accordance with the changed altitude information.

According to this construction, the map display device displays the vicinity of the car position flatly and the other area three-dimensionally. Accordingly, in addition to the above effects, the display of the vicinity of the car position is kept from being obstructed by undulations.

(16) In the map display device of (15), the altitude changing unit may further change altitudes shown by the altitude information that correspond to positions which belong to an area around the first area in the map, in accordance with distances of the positions from the first area.

According to this construction, the boundary area between the flatly displayed area and the three-dimensionally displayed area is displayed so that the flat area and the three-dimensional area show continuity. Accordingly, in addition to the above effects, unnaturalness in visuality is reduced.

(17) In the map display device of (10), when sequentially displaying the projected images, the projecting/displaying unit may also display character strings that show the objects, with reference to display positions of the graphics that represent the objects.

According to this construction, the map display device does not subject character fonts to perspective projection, but directly displays the character fonts at the corresponding position on the display screen. As a result, the deformation of the character fonts due to perspective projection is avoided, with it being possible to increase the character viewability.

(18) The above object can also be achieved by a map display device characterized by (a) transforming, when a position of a point of interest on a map is indicated by a user, first coordinate information which relates to the map to second coordinate information on a curved surface whose shape corresponds to the indicated position, and (b) displaying the map according to the second coordinate information.

According to this construction, when the driver indicates the position of the point of interest on the map, the map display device displays the map in which a portion including the point of interest is enlarged or contracted.

(19) The above object can also be achieved by a map display method including: a surface generating step for generating surfaces which are obtained in a process of gradually deforming a surface from a first shape to a second shape, the generated surfaces including (a) intermediate surfaces that each have an intermediate shape between the first shape and the second shape and (b) a surface that has the second shape; a mapping step for (a) transforming first coordinate information to second coordinate information on each of the generated surfaces, the first coordinate information showing positions of objects in a map, and (b) texture-mapping graphics that represent the objects onto each of the generated surfaces with reference to positions shown by the second coordinate information, to obtain mapped images corresponding to the generated surfaces; and a projecting/displaying step for perspective-projecting the mapped images sequentially onto a flat virtual screen to obtain projected images, and displaying the projected images in sequence.

(20) The above object can also be achieved by a map display method including: a surface generating step for generating surfaces which are obtained in a process of gradually deforming a surface from a first shape to a second shape, the generated surfaces including (a) intermediate surfaces that each have an intermediate shape between the first shape and the second shape and (b) a surface that has the second shape; and a projecting/displaying step for (a) transforming first coordinate information to second coordinate information on each of the generated surfaces, the first coordinate information showing positions of objects in a map, (b) perspective-projecting graphics that represent the objects onto each of the generated surfaces which serve as virtual screens with reference to positions shown by the second coordinate information, to obtain projected images corresponding to the generated surfaces, and (c) displaying the projected images in sequence.

According to these constructions, the map is displayed with a desired portion gradually enlarged or contracted, while maintaining connection of roads. Hence the driver can quickly and accurately comprehend the contents of the map. Also, the map display is transformed smoothly even when the target of enlargement/contraction switches from one map portion to another, so that the driver will not lose sight of the point of interest he or she is paying attention to on the map.

(21) The above object can also be achieved by a computer-readable program for realizing a map display method on a computer, including: a surface generating step for generating surfaces which are obtained in a process of gradually deforming a surface from a first shape to a second shape, the generated surfaces including (a) intermediate surfaces that each have an intermediate shape between the first shape and the second shape and (b) a surface that has the second shape; a mapping step for (a) transforming first coordinate information to second coordinate information on each of the generated surfaces, the first coordinate information showing positions of objects in a map, and (b) texture-mapping graphics that represent the objects onto each of the generated surfaces with reference to positions shown by the second coordinate information, to obtain mapped images corresponding to the generated surfaces; and a projecting/displaying step for perspective-projecting the mapped images sequentially onto a flat virtual screen to obtain projected images, and displaying the projected images in sequence.

(22) The above object can also be achieved by a computer-readable program for realizing a map display method on a computer, including: a surface generating step for generating surfaces which are obtained in a process of gradually deforming a surface from a first shape to a second shape, the generated surfaces including (a) intermediate surfaces that each have an intermediate shape between the first shape and the second shape and (b) a surface that has the second shape; and a projecting/displaying step for (a) transforming first coordinate information to second coordinate information on each of the generated surfaces, the first coordinate information showing positions of objects in a map, (b) perspective-projecting graphics that represent the objects onto each of the generated surfaces which serve as virtual screens with reference to positions shown by the second coordinate information, to obtain projected images corresponding to the generated surfaces, and (c) displaying the projected images in sequence.

According to these constructions, the above effects can be delivered.

BRIEF DESCRIPTION OF THE DRAWINGS

These and other objects, advantages and features of the invention will become apparent from the following description thereof taken in conjunction with the accompanying drawings which illustrate specific embodiments of the invention.

In the drawings:

FIG. 3 shows an example of character information stored in the map storing unit;

FIG. 5 shows an example of information stored in the surface storing unit;

FIG. 6 shows an example of information stored in a point storing unit shown in FIG. 1;

FIG. 8 shows an example of car positional information output from a positional information accepting unit shown in FIG. 1;

FIG. 19 shows an example of altitude information stored in an altitude storing unit shown in FIG. 18;

FIG. 29 is a block diagram showing a map display device according to the fourth embodiment of the invention;

DESCRIPTION OF THE PREFERRED EMBODIMENTS

First Embodiment

The following is a description of a map display device 10 which is the first embodiment of the invention. The map display device 10 generates surfaces, by gradually changing a shape of a surface to an intended shape that corresponds to a position of a point of interest designated by a driver on a map. The map display device 10 texture-maps coordinate information showing the map onto each generated surface, perspective-projects the mapped images, and displays the projected images. In this way, the map is displayed with a portion which includes the point of interest being enlarged or contracted, while maintaining connections of roads.

(Overall Construction)

Figure 1:
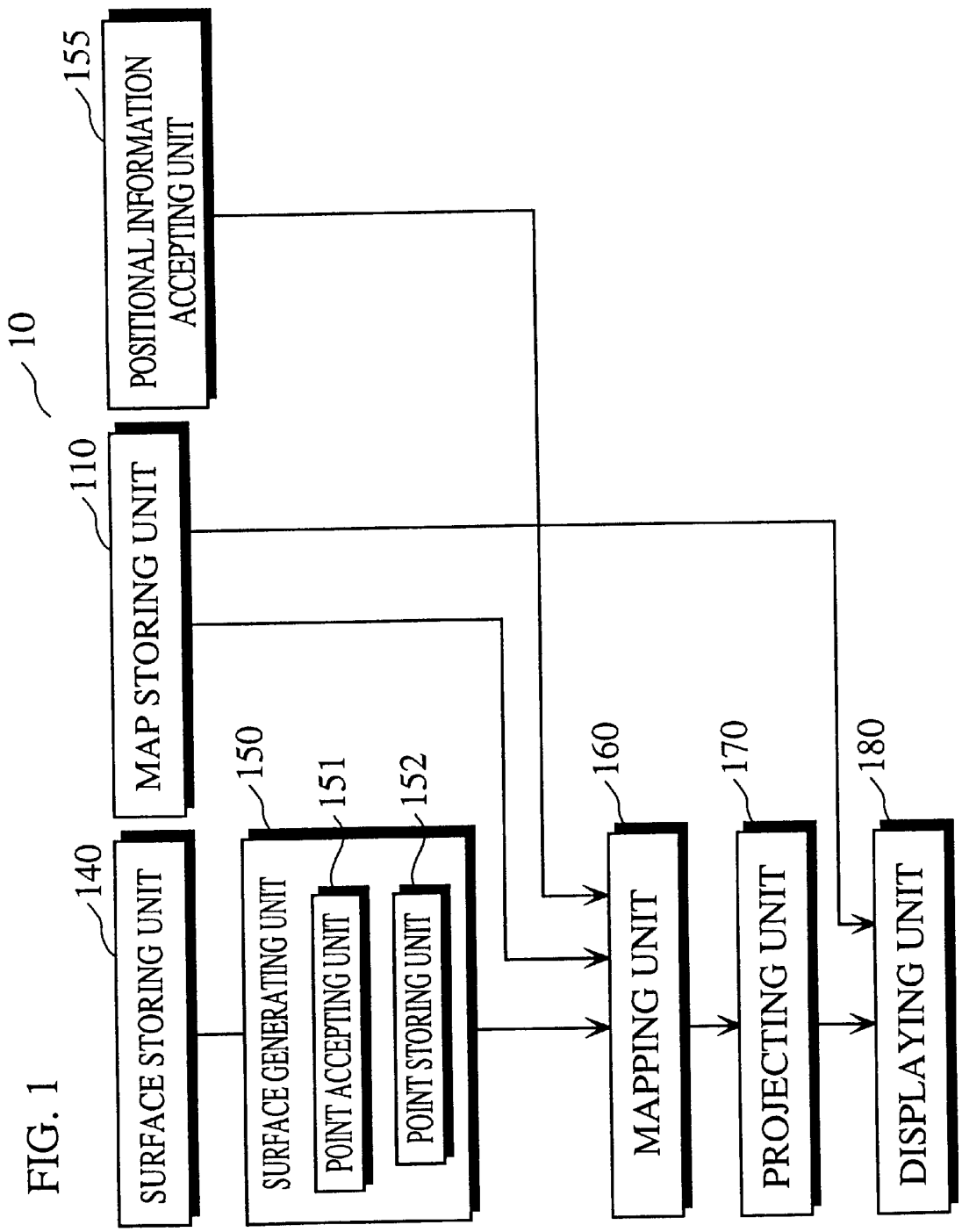
FIG. 1 is a block diagram showing a map display device according to the first embodiment of the invention.

As shown in FIG. 1, the map display device 10 includes a map storing unit 110, a surface storing unit 140, a surface generating unit 150, a positional information accepting unit 155, a mapping unit 160, a projecting unit 170, and a displaying unit 180.

The map display device 10 is implemented by software and hardware provided with a processor, a ROM (Read Only Memory) storing programs, and a working RAM (Random Access Memory). The functions of each construction element are realized whereby the processor executes the programs stored in the ROM. Also, the data transfer between the construction elements is carried out via the hardware such as the RAM.

(Map Storing Unit 110)

The map storing unit 110 stores image information, character information, and first coordinate information. The image information is expressed in bitmap data, whereas the character information includes character strings. The first coordinate information shows each character position and each pixel position of the image information. The first coordinate information is expressed using coordinates in a two-dimensional orthogonal coordinate system which covers the entire map. Such a coordinate system is hereafter referred to as "st coordinate system".

Figure 2:
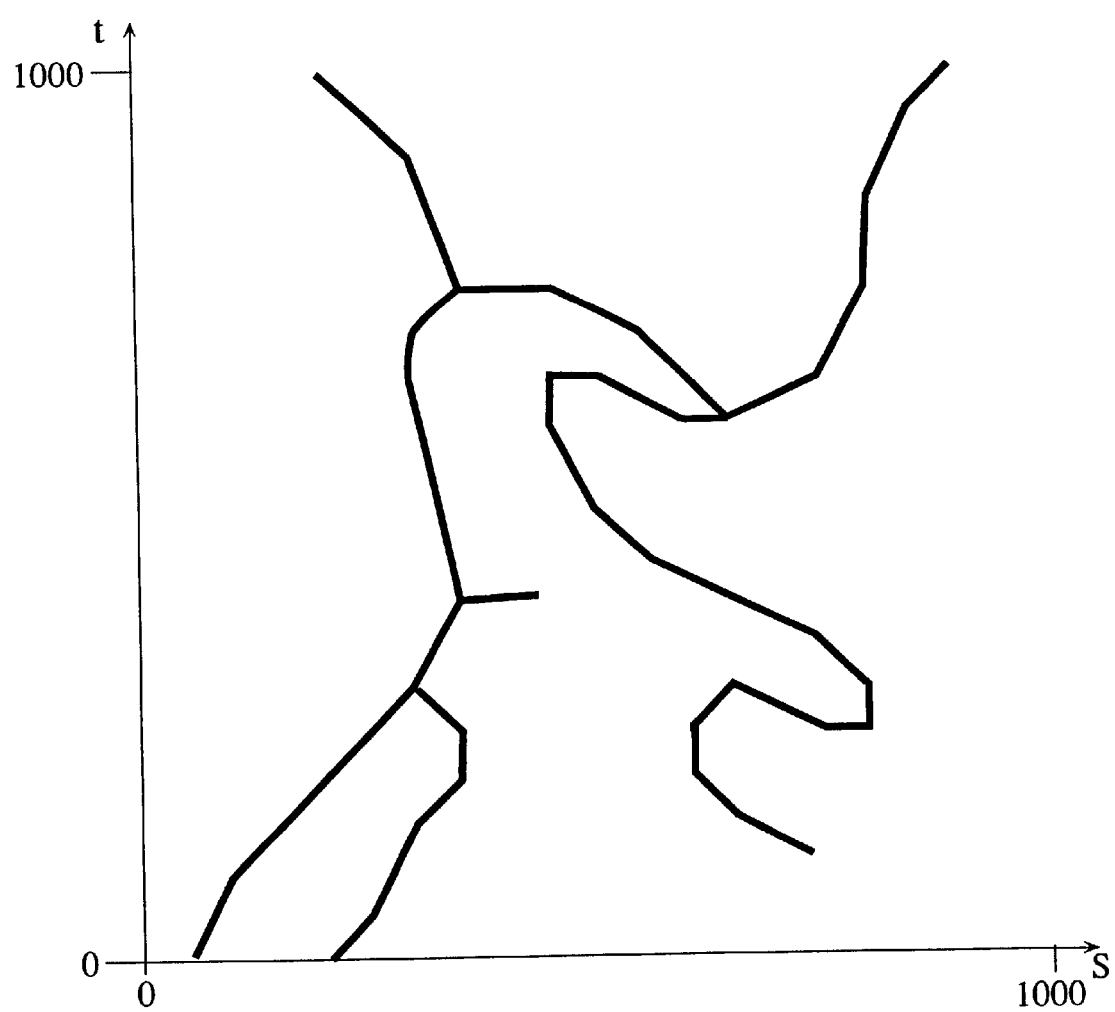
FIG. 2 shows an example of image information stored in a map storing unit shown in FIG. 1.

FIG. 2 shows an example of the image information stored in the map storing unit 110. This image information corresponds to first coordinate information in the range of $0 \leq s \leq 1000$ and $0 \leq t < 1000$.

FIG. 3 shows an example of the character information stored in the map storing unit 110. Reference numeral 111 is a character information table which lists character strings and first coordinate information showing positions of the character strings.

(Surface Storing Unit 140)

The surface storing unit 140 stores information that defines a plurality of different surfaces which exist in a virtual space where perspective projection is performed (hereafter simply referred to as "virtual space"), and to which the image information is to be mapped. Here, the virtual space is represented by a three-dimensional orthogonal coordinate system which is hereafter referred to as "xyz coordinate system".

In more detail, the surface storing unit 140 stores information that defines a curved surface in which an angle between a part of the curved surface to which a map portion to be enlarged is texture-mapped and a line of sight in perspective projection is larger than any angles between the other parts of the curved surface and lines of sight in the perspective projection, in association with information showing a part of the display screen corresponding to the map portion. The surface storing unit 140 also stores information that defines a curved surface in which an angle between a part of the curved surface to which a map portion to be contracted is texture-mapped and a line of sight in perspective projection is smaller than any angles between the other parts of the curved surface and lines of sight in the perspective projection, in association with information showing a part of the display screen corresponding to the map portion. The effect of enlarging/contracting a map portion in accordance with a shape of a curved surface is detailed later in the description of the projecting unit 170.

The surface storing unit 140 further stores information defining a flat surface which does not have the effect of enlarging/contracting any map portion. In this specification, these information stored in the surface storing unit 140 for defining curved and flat surfaces is called "surface definition information".

Surface definition information is stored in the surface storing unit 140 in one of the following forms.

① A surface expressed by a relationship equation of x, y, and z.

② A surface obtained by interpolating a plurality of sample points on the surface.

③ A surface obtained by expressing the x, y, and z coordinates of a point on the surface using parameters u and v.

Figure 4A:
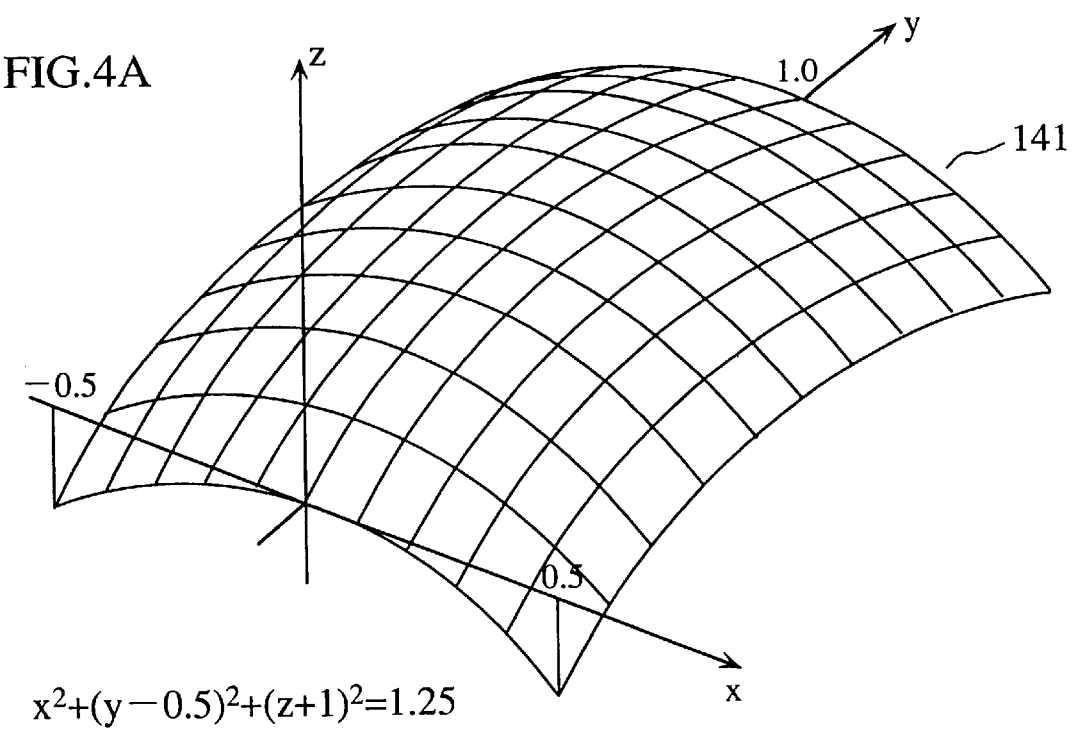
FIGS. 4A–B shows example shapes of curved surfaces stored in a surface storing unit shown in FIG. 1.
Figure 4B:
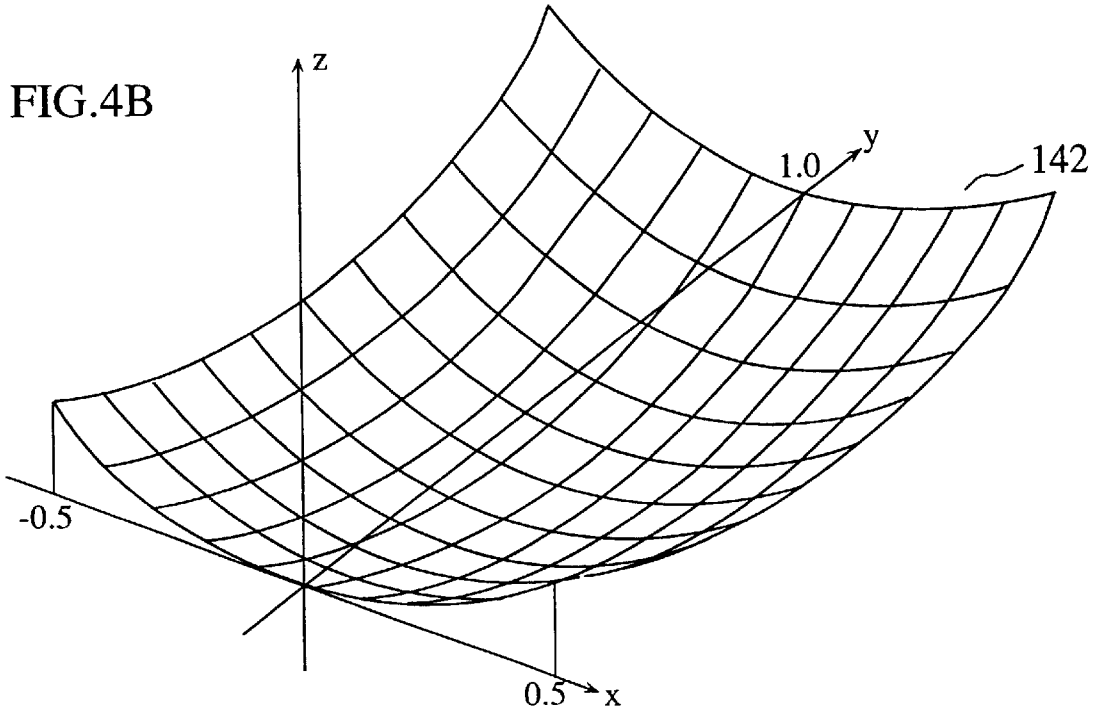

FIGS. 4A and 4B each show an example curved surface. FIG. 4A shows a curved surface 141 expressed by a relationship equation $$x^2+(y-0.5)^2+(z+1)^2=1.25$$

whereas FIG. 4B shows a curved surface 142 expressed by a relationship equation $$x^2+(y-0.5)^2+(z-1)^2=1.25$$

Each curved surface is shown in the range of $-0.5 \leq x \leq 0.5$ and $0 \leq y \leq 1$. To facilitate the understanding of the shape of each curved surface, geodesic lines are provided in 0.1 intervals for both of the x and y coordinates. The curved surface 141 is used to enlarge a nearer portion of a map, whereas the curved surface 142 is used to enlarge a farther portion of the map. The nearer portion and farther portion of the map correspond to the lower part and upper part of the display screen respectively.

FIG. 5 shows an example of surface definition information stored in the surface storing unit 140, for curved and flat surfaces. In the surface storing unit 140, the surface definition information is stored in a surface definition information field, while information showing a part of the display screen at which a map portion to be enlarged or contracted is displayed is stored in an enlarged/contracted portion field.

Note that the surface storing unit 140 may instead store the surface definition information in the above form ② or ③ (not illustrated)

(Surface Generating Unit 150)

The surface generating unit 150 generates curved surfaces by gradually changing a surface from one shape to another, in accordance with the driver's operation. Here, each curved surface assumes an intermediate shape between the two shapes. The surface generating unit 150 outputs surface definition information defining each curved surface, to the mapping unit 160. This is explained in detail below.

The surface generating unit 150 includes a point accepting unit 151 and a point storing unit 152.

As an example, the point accepting unit 151 is implemented by a touch panel provided in front of the display screen equipped in the displaying unit 180. When the driver touches a position of a point of interest on the touch panel and designates enlargement or contraction, the point accepting unit 151 estimates the position of the point of interest on the display screen, and notifies the surface generating unit 150 of the position of the point of interest on the display screen and the designation of enlargement/contraction.

The point storing unit 152 stores the position and the designation of enlargement/contraction. As shown in FIG. 6, the point storing unit 152 has a previous point field and a current point field, each of which stores a position of a point of interest and a designation of enlargement/contraction. Initially, information showing that no point of interest is designated is stored in both fields.

The surface generating unit 150 is notified by the point accepting unit 151 of the position of the point of interest on the display screen and the designation of enlargement/contraction. The surface generating unit 150 transfers the contents of the current point field to the previous point field, and writes the notified information to the current point field. Following this, if the position of the previous point of interest is designated, the surface generating unit 150 acquires surface definition information defining such a curved surface that includes the previous point of interest within a portion to be enlarged or contracted, from the surface storing unit 140. If the position of the previous point of interest is not designated, the surface generating unit 150 acquires surface definition information defining the flat surface from the surface storing unit 140. In the same manner, the surface generating unit 150 acquires surface definition information for the current point of interest. The surface generating unit 150 sequentially generates curved surfaces, by gradually changing the shape of the curved or flat surface defined by the surface definition information acquired for the previous point of interest (hereafter called "previous surface"), to the shape of the curved or flat surface defined by the surface definition information acquired for the current point of interest (hereafter "current surface"). Here, the generated curved surfaces each assume an intermediate shape between the shapes of the previous and current surfaces.

As an example technique for generating these curved surfaces, the surface generating unit 150 equally divides the transformation of the shape from the previous to current surfaces by ten, thereby generating nine curved surfaces having intermediate shapes between the two shapes. This technique is described in detail below.

(1) When a curved surface is defined by a relationship equation of x, y, and z, a plurality of points which have common x and y coordinates on the previous and current surfaces are calculated. Let $P1: (x_1,y_1,zp_1) \ldots Pn: (x_n,y_n,zp_n)$ be n points calculated for the previous surface, and $C1: (x_1,y_1,zc_1) \ldots Cn: (x_n,y_n,zc_n)$ be n points calculated for the current surface. The surface generating unit 150 sequentially generates nine curved surfaces which are each defined by n sample points $S1i: (x_1,y_1,zp_1+i(zc_1-zp_1)/10) \ldots$ $Sni: (x_n,y_n,zp_n+i(zc_n-zp_n)/10)$ where i=1, ..., 9.

(2) When a curved surface is defined by a plurality of sample points on the surface, let $P1: (x_1,y_1,zp_1) \ldots Pm: (x_m,y_m,zp_m)$ be m sample points defining the previous surface, and $C1: (x_1,y_1,zc_1) \ldots Cm: (x_m,y_m,zc_m)$ be m sample points defining the current surface. The surface generating unit 150 generates nine curved surfaces which are each defined by m sample points $S1i: (x_1,y_1,zp_1+i(zc_1-zp_1)/10) \ldots$ $Smi: (x_m,y_m,zp_m+i(zc_m-zp_m)/10)$ where i=1, ..., 9.

The above examples show the case where the previous surface and the current surface are defined by sample points with common x and y coordinates. Suppose the previous and current surfaces are defined by sample points whose x and y coordinates differ between the two surfaces. In such a case, x and y coordinates of each sample point defining one surface are bilinear interpolated to find a point having the same x and y coordinates as a sample point defining the other surface, with such a found point being used as a sample point of the former surface.

(3) When the x, y, and z coordinates of a point on a curved surface are defined by the parameters u and v, let $P: (xp(u,v), yp(u,v), zp(u,v))$ be the previous surface, and $C: (xc(u,v), yc(u,v), zc(u,v))$ be the current surface. The surface generating unit 150 sequentially generates nine curved surfaces which are each defined by $Mi: (xp(u,v)+i(xc(u,v)-xp(u,v))/10,$ $yp(u,v)+i(yc(u,v)-yp(u,v))/10,$ $zp(u,v)+i(zc(u,v)-zp(u,v))/10)$ where i=1, ..., 9.

The surface generating unit 150 outputs surface definition information of each of the generated curved surfaces, sequentially to the mapping unit 160. The surface generating unit 150 lastly outputs the surface definition information of the current surface to the mapping unit 160.

Figure 7:
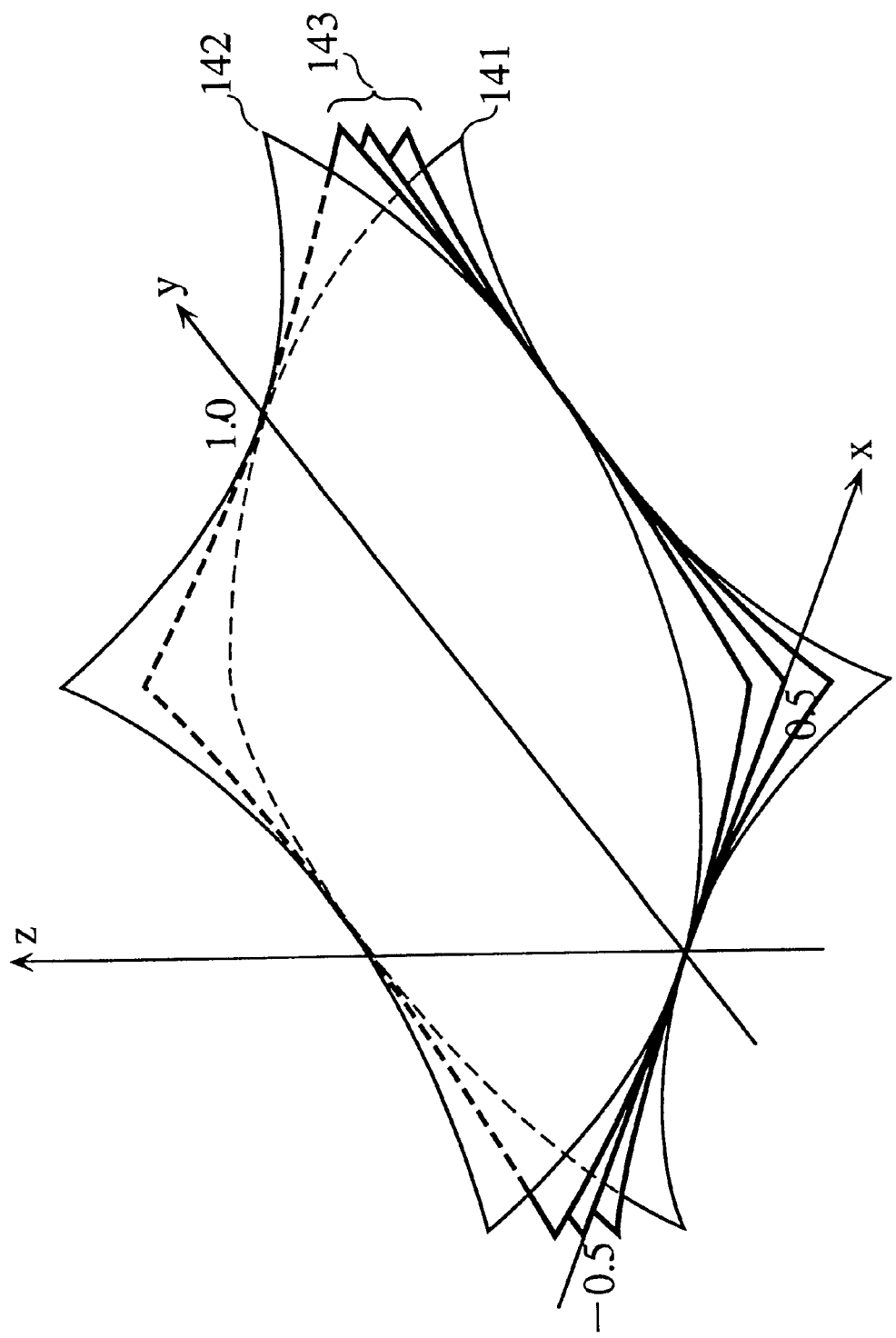
FIG. 7 shows example shapes of surfaces output from a surface generating unit shown in FIG. 1.

FIG. 7 is a conceptual diagram showing an example of surfaces output from the surface generating unit 150, when the driver, who has designated a point of interest located at the lower part of the display screen as the enlargement target, newly designates a point of interest located at the upper part of the display screen as the enlargement target.

In this example, the surface generating unit 150 sets the curved surface 141 for enlarging the lower part of the display screen as the previous surface, and the curved surface 142 for enlarging the upper part of the display screen as the current surface. The surface generating unit 150 sequentially generates curved surfaces 143 which each have an intermediate shape between the shape of the curved surface 141 and the shape of the curved surface 142. The surface generating unit 150 outputs surface definition information of each of the generated curved surfaces to the mapping unit 160, and then outputs surface definition information of the curved surface 12 to the mapping unit 160.

(Positional Information Accepting Unit 155)

The positional information accepting unit 155 accepts car positional information relating to the current position and traveling direction of a car in which the map display device 10 is mounted, from an outside GPS (Global Positioning System) device or inertial navigation device. The positional information accepting unit 155 outputs the car positional information to the mapping unit 160.

FIG. 8 shows an example of the car positional information. Car positional information 156 is made up of information on the current position and traveling direction of the car. The car position is expressed by coordinates in the st coordinate system, whereas the traveling direction is expressed by an angle measured from the s axis counter-clockwise.

(Mapping Unit 160)

The mapping unit 160 receives the car positional information from the positional information accepting unit 155, and calculates an area which is subjected to map display (hereafter called "display target area") in accordance with the car positional information. The mapping unit 160 maps image information included in the calculated display target area, onto each surface output from the surface generating unit 150. The details are explained below.

The mapping unit 160 calculates a rectangular area which includes the current position of the car, as the display target area. As one example, the mapping unit 160 calculates an area having a range of 9 km ahead of the car, 1 km to the rear, and 5 km to both the left and the right.

Figure 9:
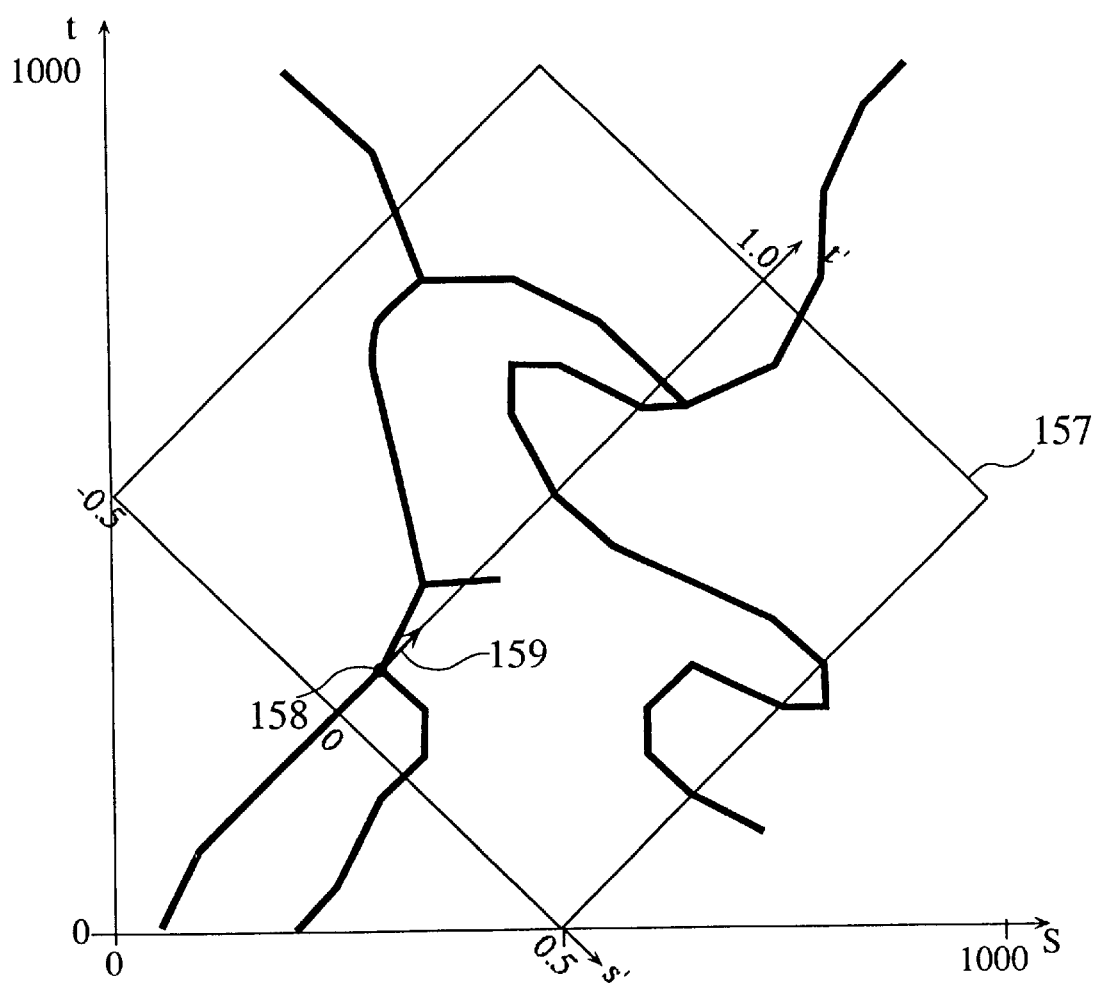
FIG. 9 is a conceptual view for explaining a mapping range of a map according to car positional information.

FIG. 9 shows the area calculated by the mapping unit 160. In the drawing, reference numeral 157 is the display target area, 158 the car position, and 159 the traveling direction.

The mapping unit 160 then finds a coordinate transformation which corresponds the st coordinates of the display target area to the xy coordinates of the virtual space. This transformation is composed of parallel translation and rotation according to the car position and traveling direction, and contraction. The mapping unit 160 calculates the transformation f, based on the amount of parallel translation and the amount of rotation in accordance with the car position and traveling direction, and the ratio of contraction.

Next, the mapping unit 160 calculates, for first coordinate information (s0,t0) corresponding to each pixel of the image information included in the display target area, second coordinate information (f(s0,t0),z0) showing a position on a surface which serves as a basis for texture-mapping the pixel onto the surface, in the following way.

(1) When the surface is defined by a relationship equation of x, y, and z, assign f(s0,t0) to x and y of the relationship equation, and find z0.

(2) When the surface is defined by a plurality of sample points on the surface, bilinear interpolate the coordinates of sample points which are in the vicinity of f(s0,t0) with respect to the x and y coordinates, and obtain z0.

(3) When the x, y, and z coordinates of a point on the surface are defined using the parameters u and v, assign f(s0,t0) to x and y to find u0 and v0, and obtain z0 from u0 and v0.

The mapping unit 160 texture-maps each pixel of the image information based on the obtained position (f(s0,t0), z0) on the surface. This mapping is done using conventional texture mapping.

Here, a texture mapping method that depends on an area contribution ratio or a texture mapping method that interpolates pixels using bilinear interpolation or the like, which are conventionally used for anti-aliasing, may be applied to the texture mapping by the mapping unit 160.

Figure 10:
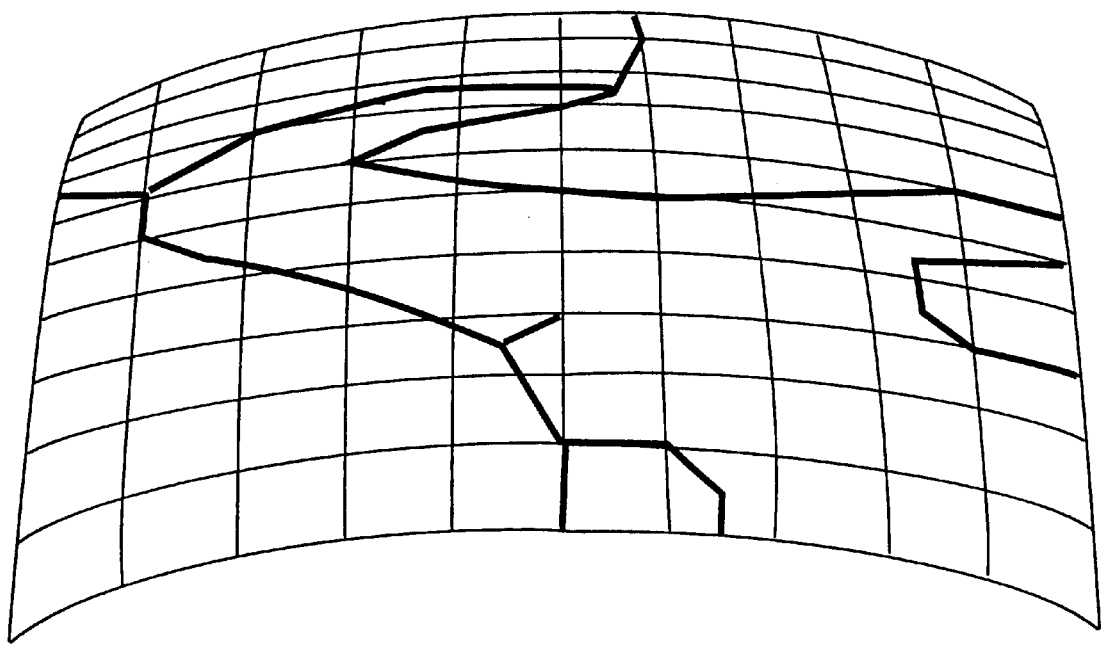
FIG. 10 shows an example of image information mapped by a mapping unit shown in FIG. 1.
Figure 11:
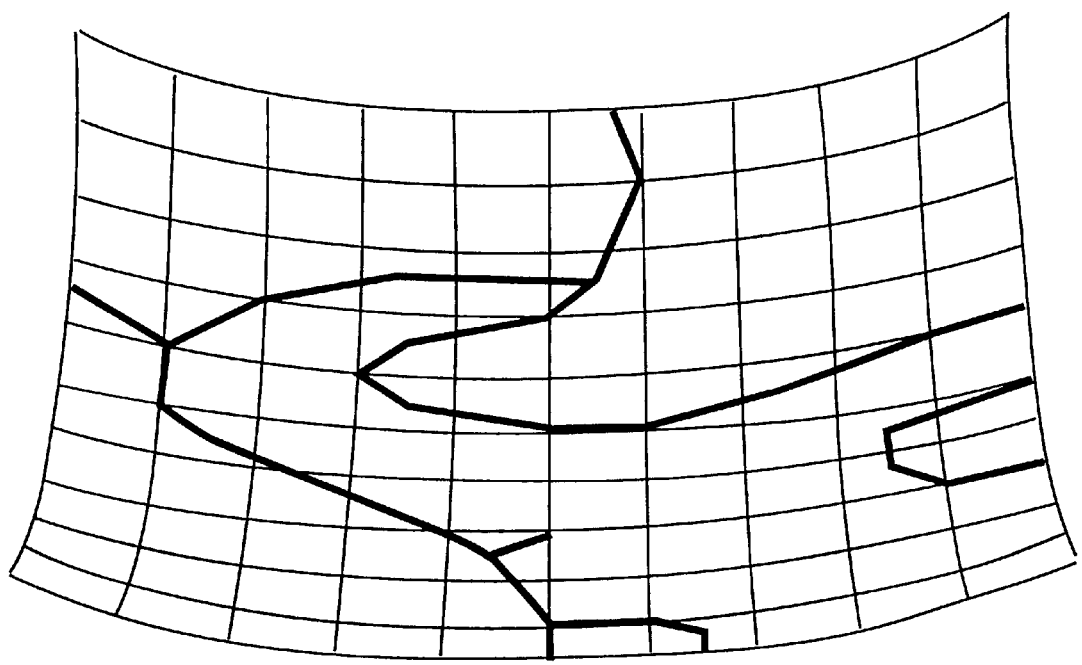
FIG. 11 shows an example of image information mapped by the mapping unit.

FIG. 10 shows the result of texture-mapping the image information included in the display target area 157 shown in FIG. 9, onto the curved surface 141 shown in FIG. 4A. FIG. 11 shows the result of texture-mapping t he same image information onto the curved surface 142 shown in FIG. 4B. For better understanding of the shapes, geodesic lines are provided in both drawings.

The mapping unit 160 performs texture mapping, for each surf ace output from the surface generating unit 150.

(Projecting Unit 170)

The projecting unit 170 perspective-projects the image information which is texture-mapped on each surface by the mapping unit 160, onto a flat virtual screen. The details are given below.

Figure 12A:
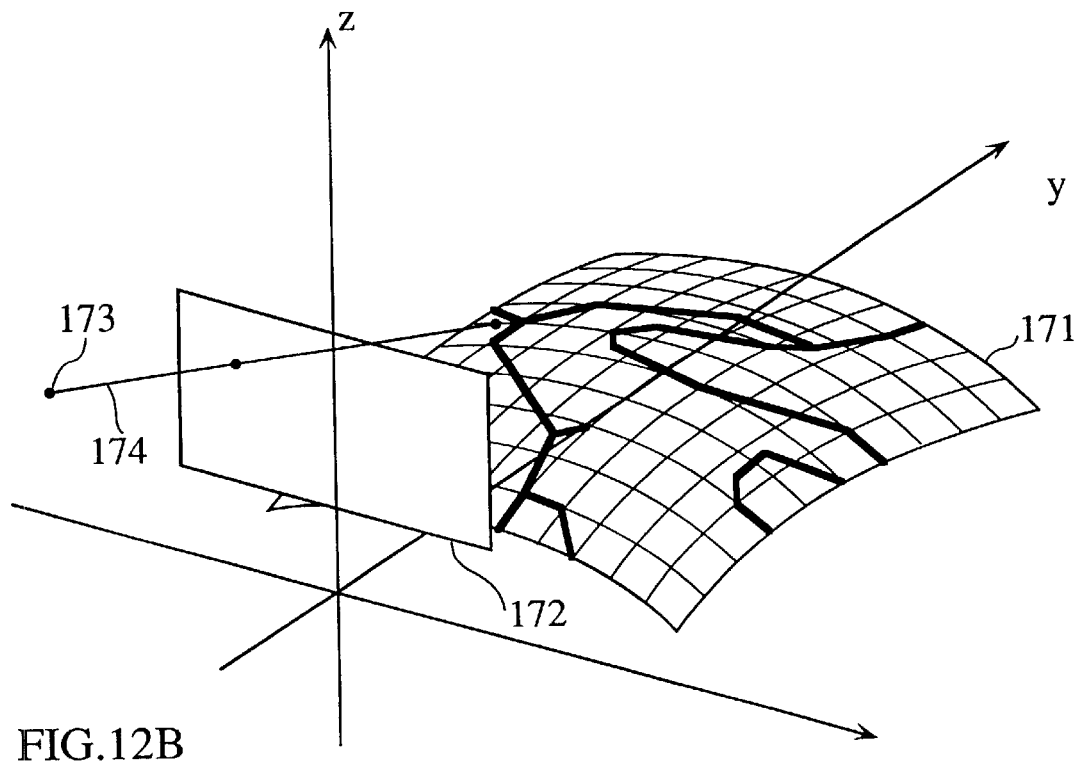
FIG. 12A is a conceptual view for explaining perspective projection performed by a projecting unit shown in FIG. 1.

FIG. 12A is a conceptual diagram showing the perspective projection performed by the projecting unit 170 for the texture mapping result of FIG. 10, where the positional relations between a curved surface 171, a virtual screen 172, an eyepoint 173, and a line of sight 174 are shown. In the same way as the conventional map display using the low of perspective, the projecting unit 170 virtually positions the eyepoint 173 before the curved surface 171 in the traveling direction at an appropriate height, and positions the virtual screen 172 so as to provide adequate vision. This being so, an image projected on the virtual screen 172 is analogous to a view when an actual geographic area is looked at from the sky. This provides a realistic map to the driver, and helps him or her comprehend the perspective.

Figure 12B:
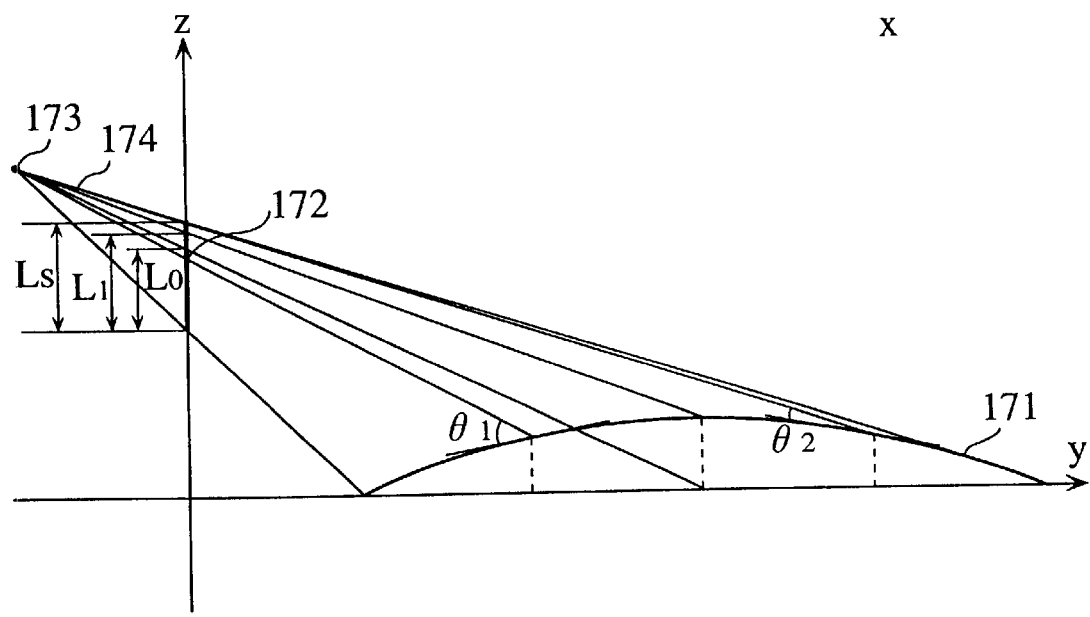
FIG. 12B is a sectional view of FIG. 12A where x=0.

FIG. 12B is a sectional view of FIG. 12A where x=0. In the drawing, Ls denotes the height of the virtual screen 172, and L1 denotes the length at which the nearer half of the curved surface 171 in the traveling direction is projected onto the virtual screen 172. Also, to compare with the case where no map portion is enlarged, the length at which the nearer half of a flat surface that has the same range as the curved surface 171 in x and y coordinates is projected on the virtual screen 172 is shown by L0.

As illustrated, a nearer part of the curved surface 171 in the traveling direction intersects a line of sight at a large angle $\theta 1$, while a farther part of the curved surface 171 in the traveling direction intersects a line of sight at a small angle $\theta 2$. Regarding a same-size part of the curved surface 171, the smaller an angle between the part of the curved surface and the line of sight, the smaller an area at which the part of the curved surface is projected onto the virtual screen. Accordingly, in the image obtained as a result of perspective-projecting the map mapped on the curved surface 171, near-by areas are enlarged whilst distant areas are contracted. This is also demonstrated by L0<L1.

Figure 13A:
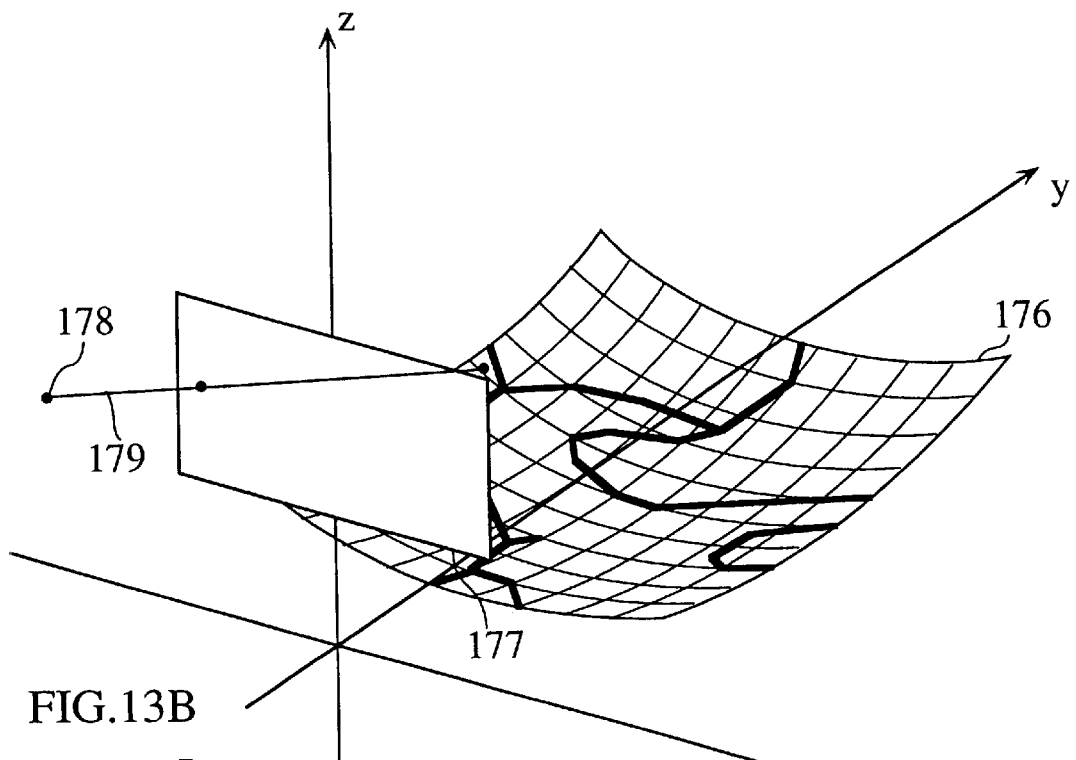
FIG. 13A is a conceptual view for explaining perspective projection performed by the projecting unit.

FIG. 13A is a conceptual diagram showing the perspective projection which is performed by the projecting unit 170 for the texture mapping result of FIG. 11. In the drawing, reference numeral 176 is a curved surface, 177 a virtual screen, 178 an eyepoint, and 179 a line of sight. Their positioning and the effects achieved by it are as described above.

Figure 13B:
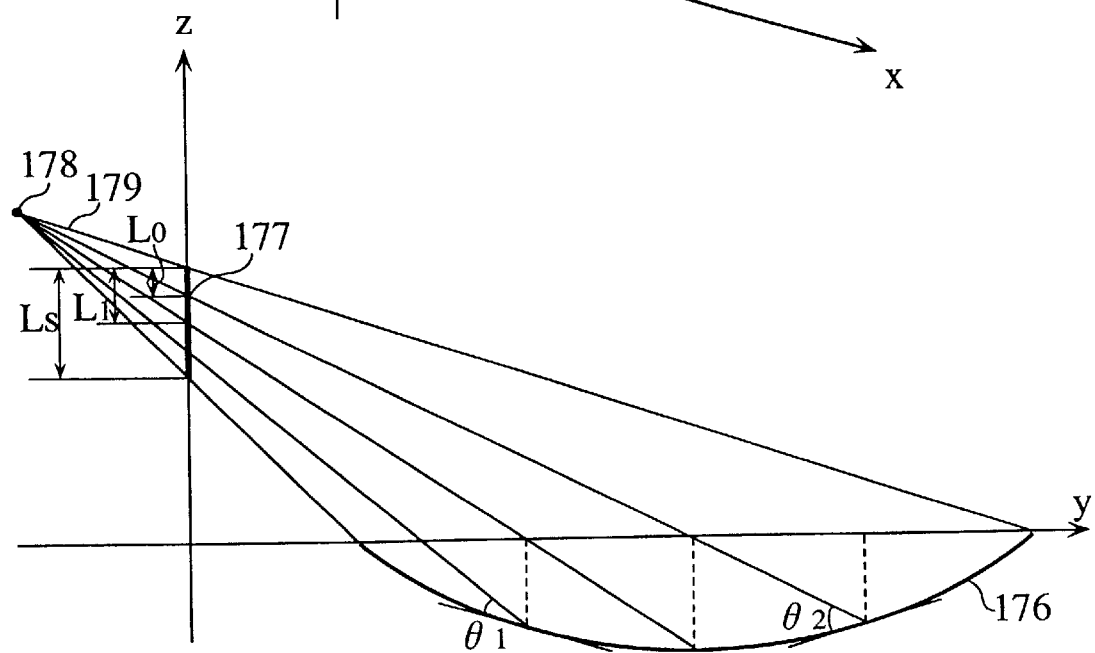
FIG. 13B is a sectional view of FIG. 13A where x=0.

FIG. 13B is a sectional view of FIG. 13A where x=0. In the drawing, Ls denotes the height of the virtual screen 177, L1 denotes the length at which the farther half of the curved surface 176 in the traveling direction is projected on the virtual screen 177, and L0 denotes the length at which the farther half of a flat surface having the same range as the curved surface 176 in x and y coordinates is projected on the virtual screen 177.

As illustrated, a nearer part of the curved surface 176 in the traveling direction intersects a line of sight at a small angle θ1, while a farther part of the curved surface 176 in the traveling direction intersects a line of sight at a large angle θ2. Accordingly, in the image obtained by perspective-projecting the map mapped on the curved surface 176, near-by areas are contracted while distant areas are enlarged. This is also demonstrated by L0<L1.

Thus, a curved surface is designed such that an angle between a part of the curved surface to which a map portion to be enlarged is texture-mapped and a line of sight in perspective projection is larger than angles between other parts of the curved surface and lines of sight, or such that an angle between a part of the curved surface to which a map portion to be contracted is texture-mapped and a line of sight in perspective projection is smaller than angles between other parts of the curved surface and lines of sight. By texture-mapping image information onto such a curved surface and perspective-projecting it, a map can be displayed with a desired portion enlarged or contracted, while maintaining connections of roads.

For each surface output from the surface generating unit 150, the projecting unit 170 perspective-projects texture-mapped image information onto a flat virtual screen. Suppose the previous surface is the curved surface 171 shown in FIG. 12 and the current surface is the curved surface 176 shown in FIG. 13, according to the driver's operation. In such a case, the surface generating unit 150 sequentially outputs surfaces having intermediate shapes between the shape of the curved surface 171 and the shape of the curved surface 176, and then outputs the curved surface 176. The mapping unit 160 texture-maps the image information onto each of the output surfaces. The projecting unit 170 perspective-projects the image information texture-mapped on each surface, onto the flat virtual screen. As a result, projected images which shows a gradual change from an image with a nearer map portion enlarged to an image with a farther map portion enlarged are output from the projecting unit 170.

(Displaying Unit 180)

The displaying unit 180 is equipped with a display screen realized by a liquid crystal panel, a cathode-ray tube, a plasma panel, an EL (electroluminescence) panel, or similar. The displaying unit 180 displays the character information and each of the projected images, onto the display screen. The details are explained below.

The displaying unit 180 enlarges or contracts each image which is perspective-projected on the virtual screen, and displays it on the whole display screen.

The displaying unit 180 also calculates, for each surface, a point (f(s0,t0),z0) on the surface corresponding to a position (s0,t0) of each character string included in the display target area, in the same way as the mapping unit 160. The displaying unit 180 further calculates a point on the virtual screen to which the point (f(s0,t0),z0) on the surface is perspective-projected, and displays character fonts of the character string, centered on a point on the display screen corresponding to the calculated point on the virtual screen.

Thus, the map display device 10 does not subject the character fonts to texture mapping and perspective projection. Instead, the displaying unit 180 directly displays the character fonts at the calculated position on the display screen, thereby preventing the character fonts from becoming deformed by texture mapping and perspective projection.

Figure 14:
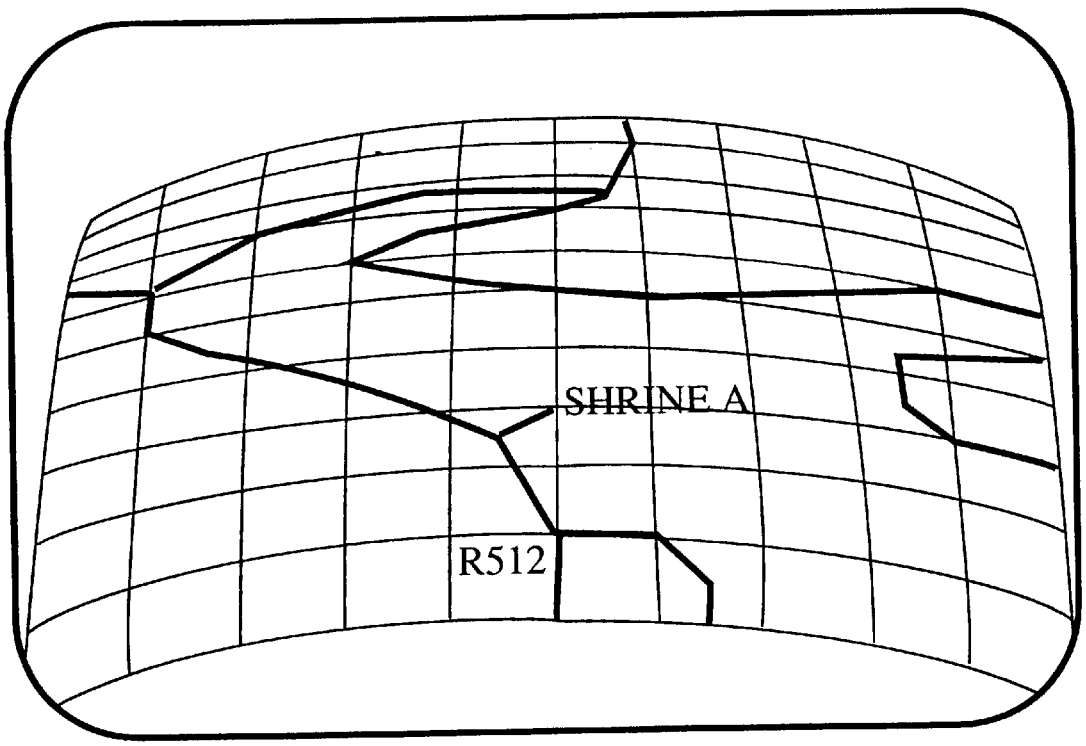
FIG. 14 shows an example map displayed by a displaying unit shown in FIG. 1.
Figure 15:
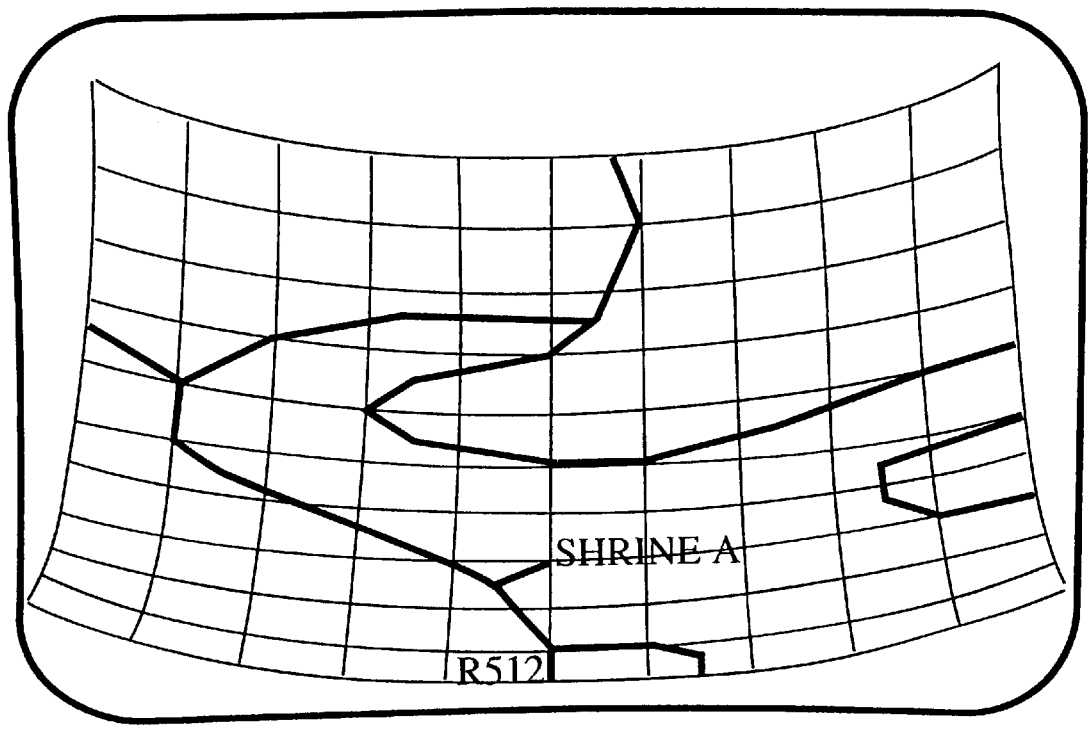
FIG. 15 shows an example map displayed by the displaying unit.

FIG. 14 shows an example display by the displaying unit 180, for the perspective projection result of FIG. 12. FIG. 15 shows an example display by the displaying unit 180, for the perspective projection result of FIG. 13. Suppose the previous surface is the curved surface 171 in FIG. 12 and the current surface is the curved surface 176 in FIG. 13, in accordance with the driver's operation. Then the displaying unit 180 displays the map which gradually transforms from FIG. 14 to FIG. 15.

(Map Display Operation)

Figure 16:
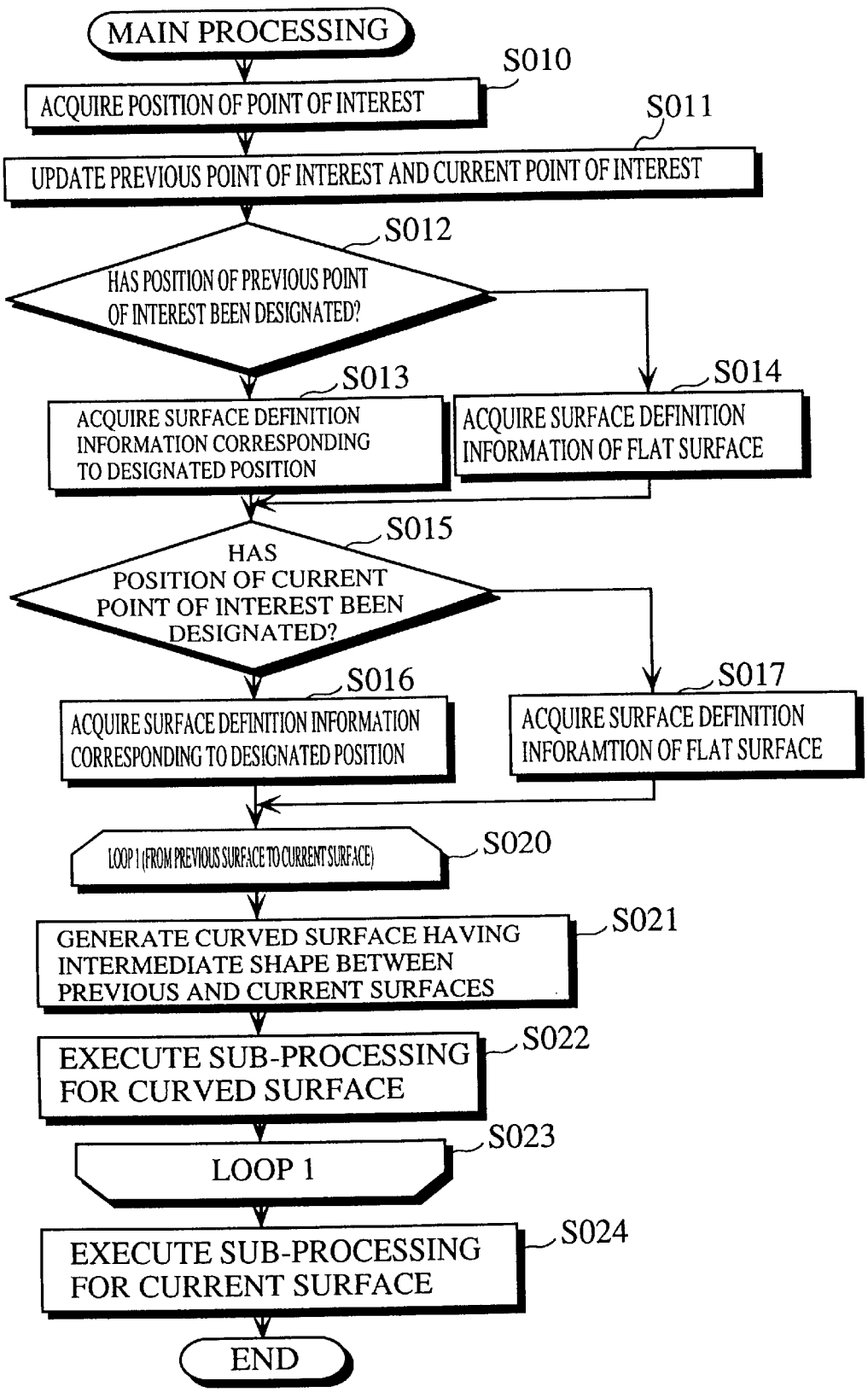
FIG. 16 is a flowchart showing main processing for map display according to the invention.
Figure 17:
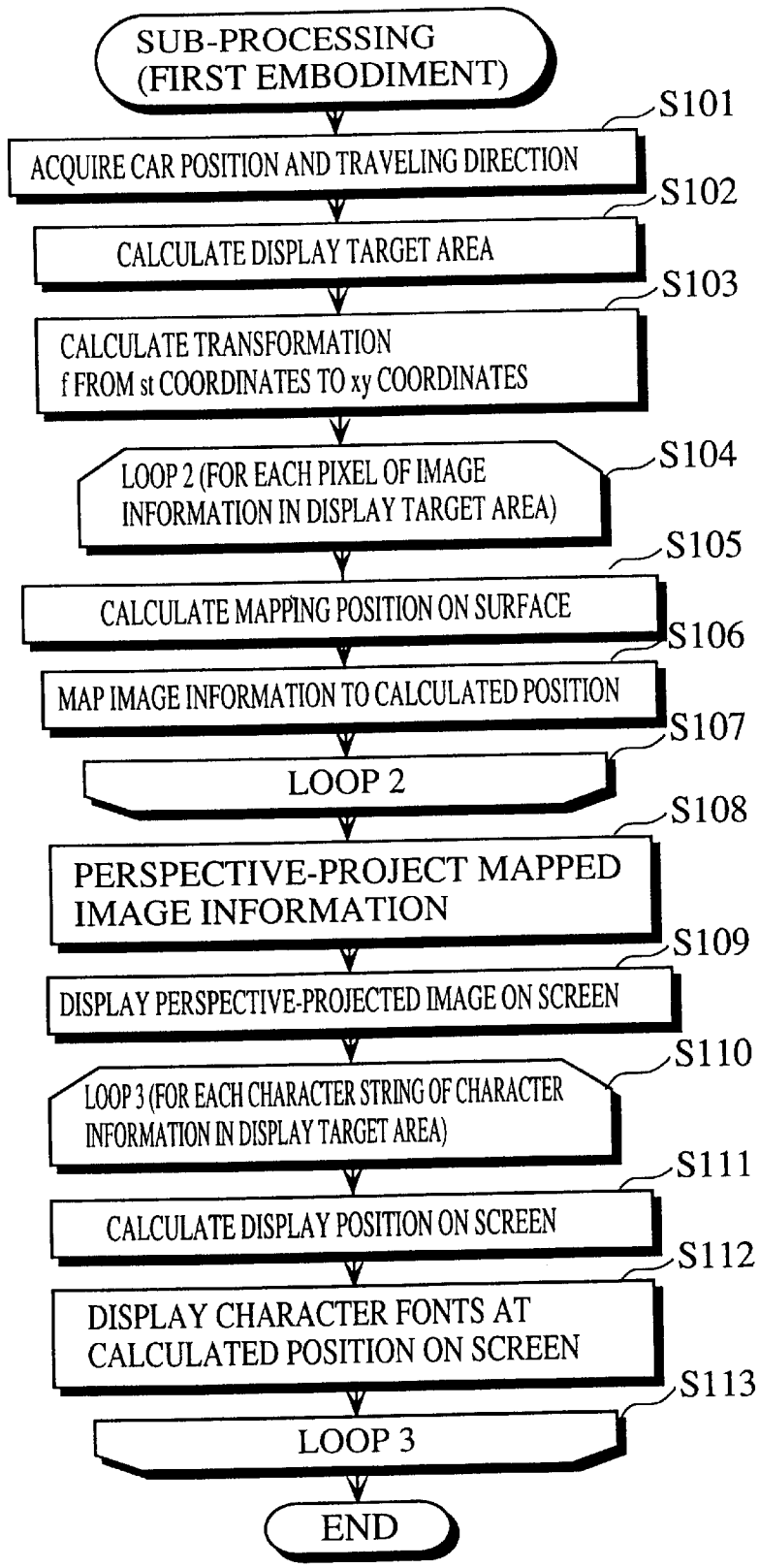
FIG. 17 is a flowchart showing sub-processing in the first embodiment.

A map display operation of the map display device 10 is explained below, with reference to FIGS. 16 and 17.

The map display device 10 performs main processing and sub-processing, to display a map which gradually changes from one shape to another. In the main processing, surfaces are generated by gradually changing a shape of a surface to another shape, in accordance with the driver's operation. The sub-processing is called for each generated surface defined by corresponding surface definition information. In the sub-processing, a map is texture-mapped on the surface defined by the surface definition information, and the result is perspective-projected.

(Main Processing)

The point accepting unit 151 acquires information showing a position of a point of interest designated by the driver on a map (S010). According to this information, the surface generating unit 150 updates the previous point of interest and the current point of interest (S011). If the position of the previous point of interest is designated (S012), the surface generating unit 150 acquires surface definition information of a curved surface for enlarging a map portion that includes the designated position, from the surface storing unit 140 (S013). If the position is not designated, on the other hand, the surface generating unit 150 acquires the surface definition information of the flat surface (S014). The surface generating unit 150 acquires surface definition information for the current point of interest from the surface storing unit 140, in the same way as above (S015-S017).

From the previous surface defined by the surface definition information acquired for the previous point of interest to the current surface defined by the surface definition information acquired for the current point of interest (S020), the surface generating unit 150 generates one curved surface which has an intermediate shape between the shapes of the previous and current surfaces (S021) The sub-processing is executed for the curved surface (S022). The curved surface generation and the sub-processing execution are repeated for each generated curved surface with an intermediate shape between the shape of the previous surface and the shape of the current surface (S023). Lastly, the sub-processing is executed for the current surface (S024).

(Sub-Processing)

In the sub-processing, the map display device 10 performs the following operation, using surface definition information of a surface specified in each of steps S022 and S024 in the main processing.

The positional information accepting unit 155 outputs car positional information showing a car position and a traveling direction, to the mapping unit 160 (S101). The mapping unit 160 calculates a display target area based on the car position and the traveling direction (S102), and calculates a transformation f from st coordinates to xy coordinates (S103).

For first coordinate information showing a position of each pixel of image information included in the display target area (S104), the mapping unit 160 calculates second coordinate information showing a position on the surface defined by the surface definition information, using the transformation f (S105). The mapping unit 160 maps the pixel based on the calculated position (S106). The projecting unit 170 perspective-projects the image information mapped by the mapping unit 160, onto the flat virtual screen (S108).

The displaying unit 180 enlarges or contracts the image perspective-projected on the virtual screen, and displays it on the whole display screen equipped therein (S109). Also, for each character string included in the display target area (S110), the displaying unit 180 calculates a display position on the display screen (S111), and displays character fonts of the character string at the display position (S112).

(Conclusion)

As described above, the map display device 10 sequentially generates surfaces by gradually changing a shape of a surface to a shape that corresponds to a position of a point of interest designated by the driver on a map. Here, the generated surfaces are made up of curved surfaces having intermediate shapes between the former and latter shapes and a surface having the latter shape. The map display device 10 then texture-maps image information on each generated surface, perspective-projects the texture-mapped images, and displays the resulting images. As a result, the map is displayed with a desired portion gradually enlarged or contracted, while maintaining connections of roads.

Here, the map display device 10 generates surfaces by changing a shape of a surface to such a shape where an angle formed between a part of the surface to which a map portion including the point of interest is mapped and a line of sight in perspective projection is larger than any angles formed between other parts of the surface and lines of sight. Using such generated surfaces, the point of interest and its vicinity can be gradually enlarged on the display screen.

Also, the map display device 10 generates surfaces by changing a shape of a surface to such a shape where an angle formed between a part of the surface to which a map portion including the point of interest is mapped and a line of sight in perspective projection is smaller than any angles formed between other parts of the surface and lines of sight. Using such generated surfaces, the point of interest and its vicinity can be gradually contracted on the display screen.

Meanwhile, the map display device 10 does not subject character information to texture mapping and perspective projection, but directly displays character fonts at corresponding positions on the display screen. In this way, the display of the character fonts can be kept from being ruined by texture mapping and perspective projection.

Second Embodiment

The following is a description of a map display device 20 which is the second embodiment of the invention. The map display device 20 generates surfaces, by gradually changing a shape of a surface to an intended shape that corresponds to a position of a point of interest designated by a driver on a map. The map display device 20 provides undulations corresponding to altitudes to each generated surface, texture-maps coordinate information showing the map onto each surface provided with undulations, and perspective-projects the texture-mapped coordinate information, before displaying the resulting projected images. By doing so, the map is displayed which has a portion including the point of interest gradually enlarged or contracted while maintaining connections of roads, and which has a three-dimensional appearance. The features that are the same as those in the first embodiment are omitted, so that the following explanation focuses on the differences with the first embodiment.

(Overall Construction)

Figure 18:
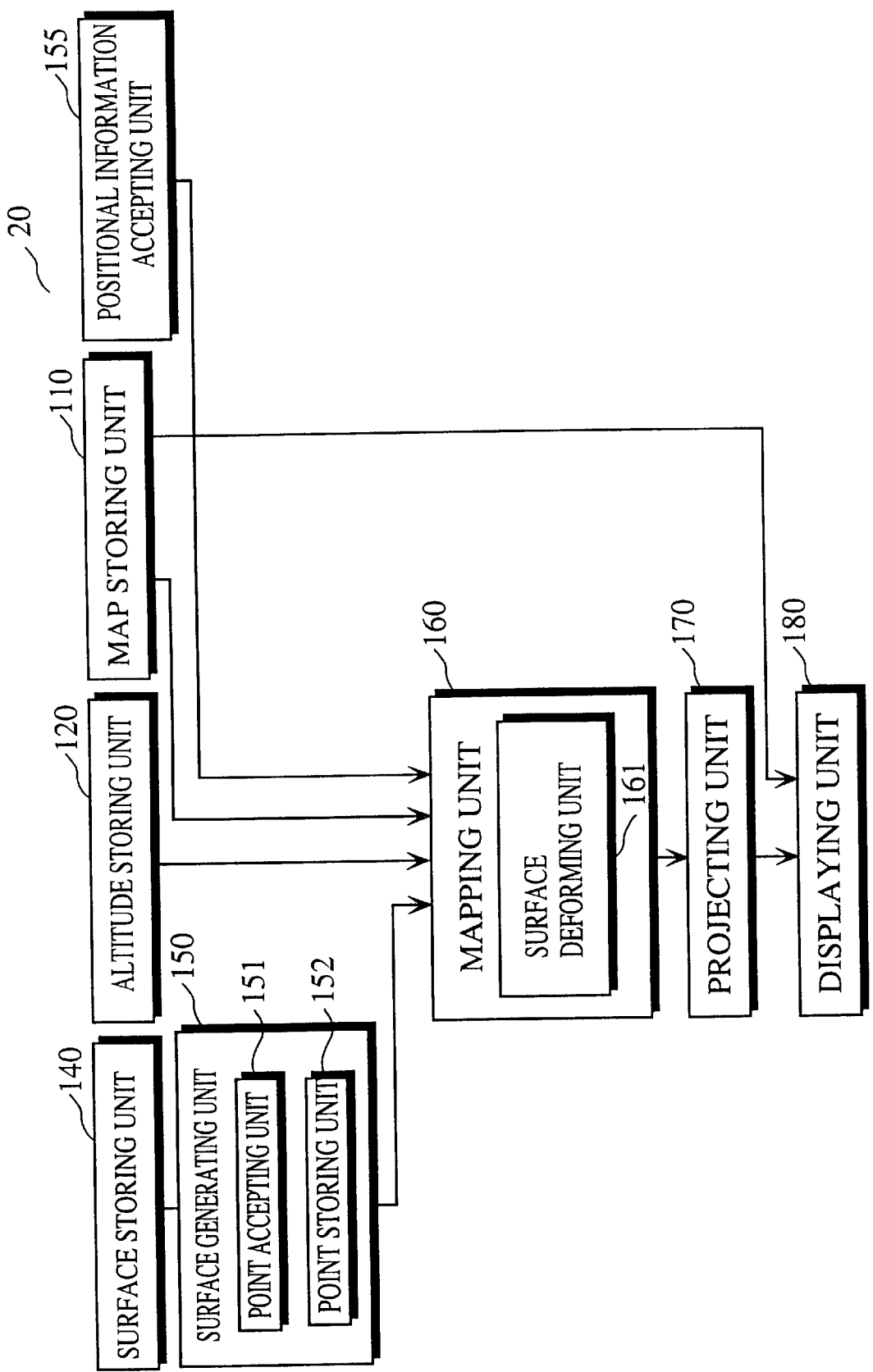
FIG. 18 is a block diagram showing a map display device according to the second embodiment of the invention.

As shown in FIG. 18, the map display device 20 includes the construction elements of the map display device 10 of the first embodiment, and further includes an altitude storing unit 120. Also, the mapping unit 160 includes a surface deforming unit 161.

(Altitude Storing Unit 120)

The altitude storing unit 120 stores altitude information which is made up of combinations of positions of altitude points and altitudes of the altitude points.

FIG. 19 shows an example of the altitude information stored in the altitude storing unit 120. An altitude table 121 lists a position and an altitude for each altitude point. Here, the position is expressed in the st coordinate system.

(Mapping Unit 160)

The mapping unit 160 receives the car positional information from the positional information accepting unit 155, calculates the display target area based on the car positional information, and texture-maps the image information included in the display target area onto each surface deformed by the surface deforming unit 161. The details are explained below.

The mapping unit 160 calculates the display target area and the transformation f, in the same way as in the first embodiment.

The mapping unit 160 notifies the surface deforming unit 161 of the display target area and the transformation f, instructs the surface deforming unit 161 to deform each surface output from the surface generating unit 150, and acquires surface definition information of each deformed surface from the surface deforming unit 161.

The mapping unit 160 then calculates, for first coordinate information (s0,t0) corresponding to each pixel of the image information included in the display target area, second coordinate information showing a position (f(s0,t0),z0) on the deformed surface which serves as a basis for texture-mapping the pixel onto the deformed surface. This calculation is done by bilinear interpolating the coordinates of sample points which are in the vicinity of f(s0,t0) in x and y coordinates, using the surface definition information acquired from the surface deforming unit 161. The mapping unit 160 then maps each pixel of the image information based on the calculated point (f(s0,t0),z0), as in the first embodiment.

(Surface Deforming Unit 161)

The surface deforming unit 161 is notified by the mapping unit 160 of the display target area and the transformation f, deforms each surface output from the surface generating unit 150 in accordance with the altitude information, and outputs each deformed surface to the mapping unit 160. The details are explained below.

The surface deforming unit 161 calculates, for each altitude point included in the display target area, a point (f(s0, t0),z0) on the surface corresponding to an altitude point at a position (s0,t0). The surface deforming unit 161 then calculates a point (f(s0,t0),z0+ah), by adding the result of multiplying an altitude h by a constant a, to z0. The surface deforming unit 161 notifies the mapping unit 160 of the calculated point, as a sample point which defines the deformed surface. Here, the constant a is a scale for altitudes in the xyz coordinate system, and also represents the degree of emphasis on undulations. In other words, the greater the value of a, the more emphasis is placed on undulations.

Figure 20:
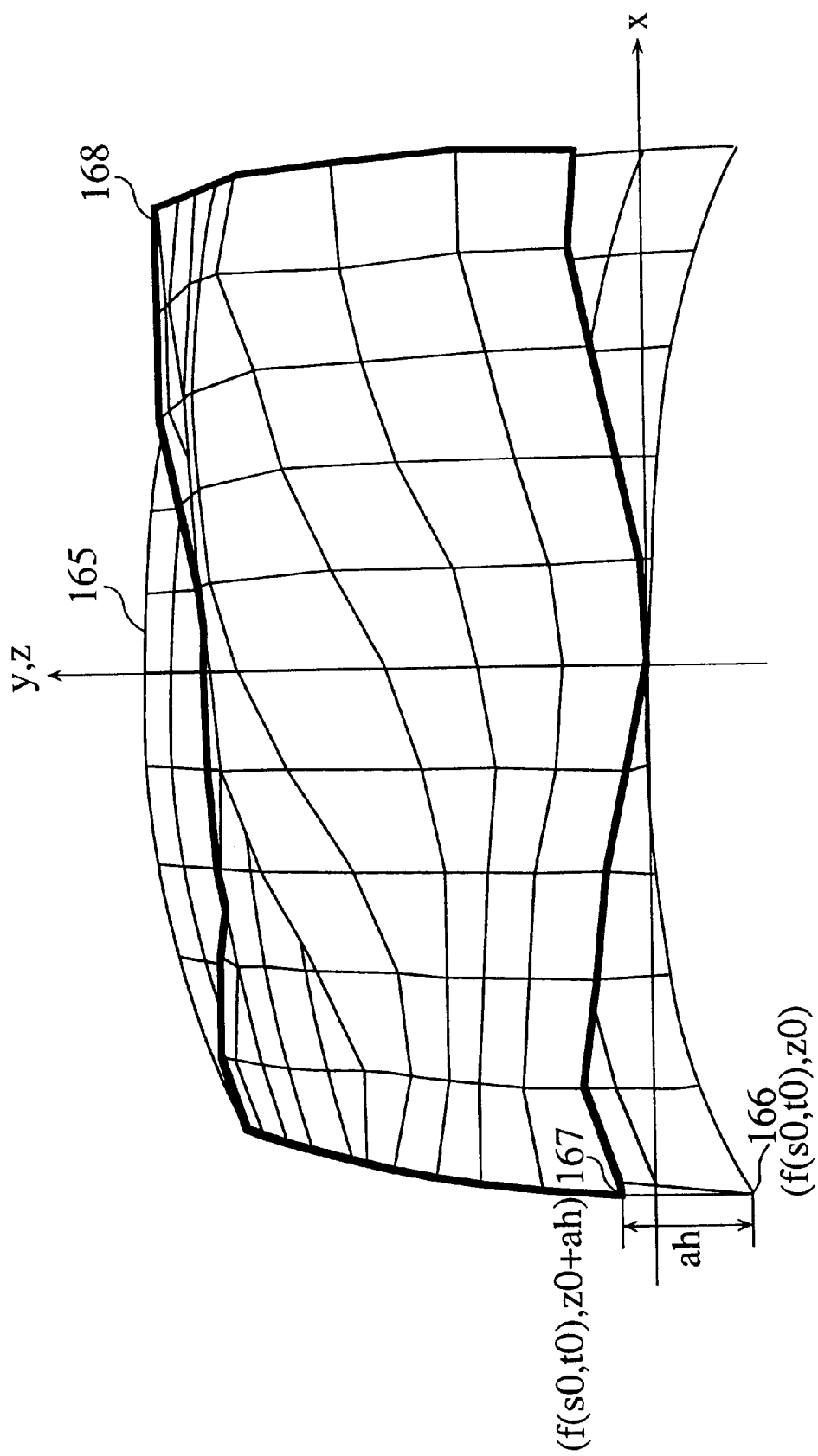
FIG. 20 is a conceptual view for explaining deformation performed by a surface deforming unit shown in FIG. 18.

FIG. 20 is a conceptual diagram showing the deformation performed by the surface deforming unit 161. In the drawing, reference numeral 165 is a surface defined by surface definition information output from the surface generating unit 150, 166 an example point on the surface corresponding to a position of an altitude point, 167 a point when the point 166 is moved in the z direction in accordance with the altitude h, and 168 the deformed surface.

Here, the difference with the mean or minimum value of the altitude values included in the display target area may be set as h. Also, when a sample point for defining the deformed surface needs to be provided at a predetermined xy coordinate position but there is no altitude point at that position, the sample point can be calculated by interpolating altitudes of neighboring altitude points using bilinear interpolation or the like.

Figure 21:
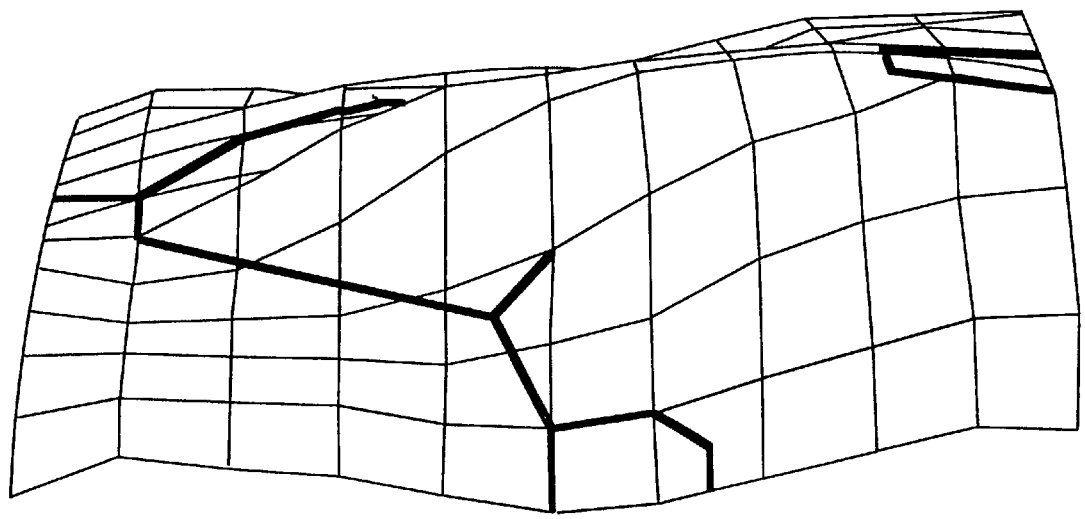
FIG. 21 shows an example of image information mapped by a mapping unit shown in FIG. 18.
Figure 22:
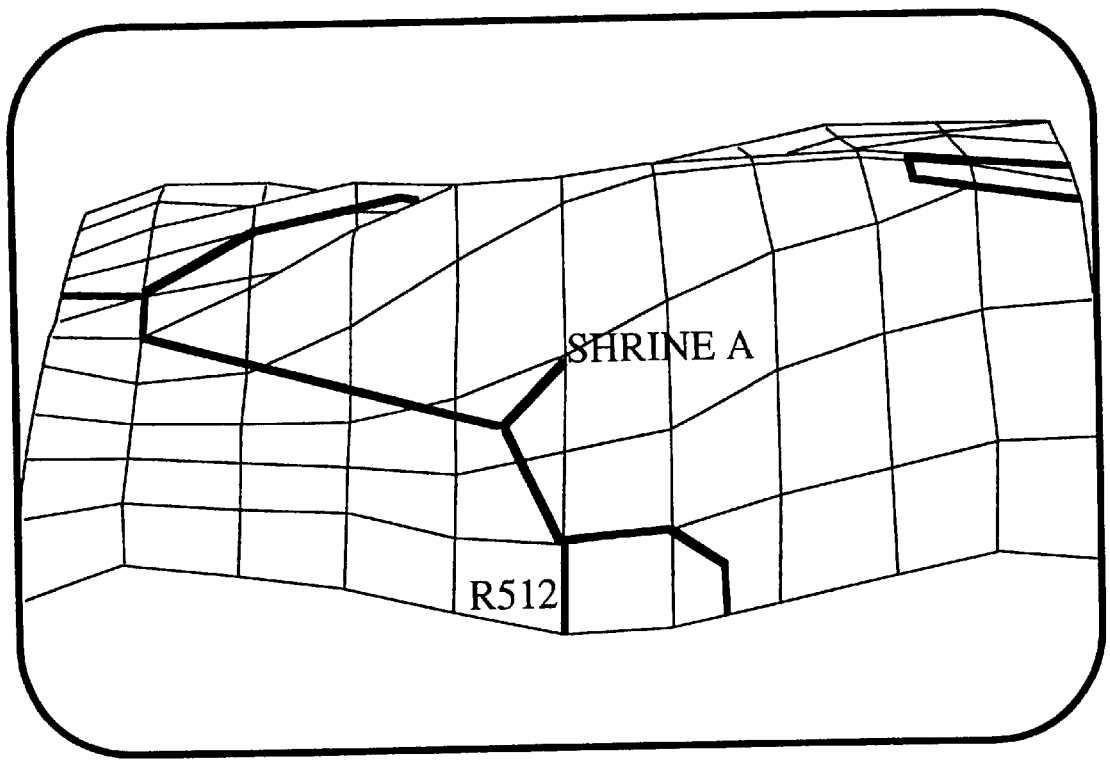
FIG. 22 shows an example map displayed by a displaying unit shown in FIG. 18.

FIG. 21 shows an example mapping result by the mapping unit 160 on the deformed surface shown in FIG. 20. FIG. 22 shows an example display by the displaying unit 180, for an image obtained by perspective-projecting the mapping result of FIG. 21 by the projecting unit 170.

(Map Display Operation)

Figure 23:
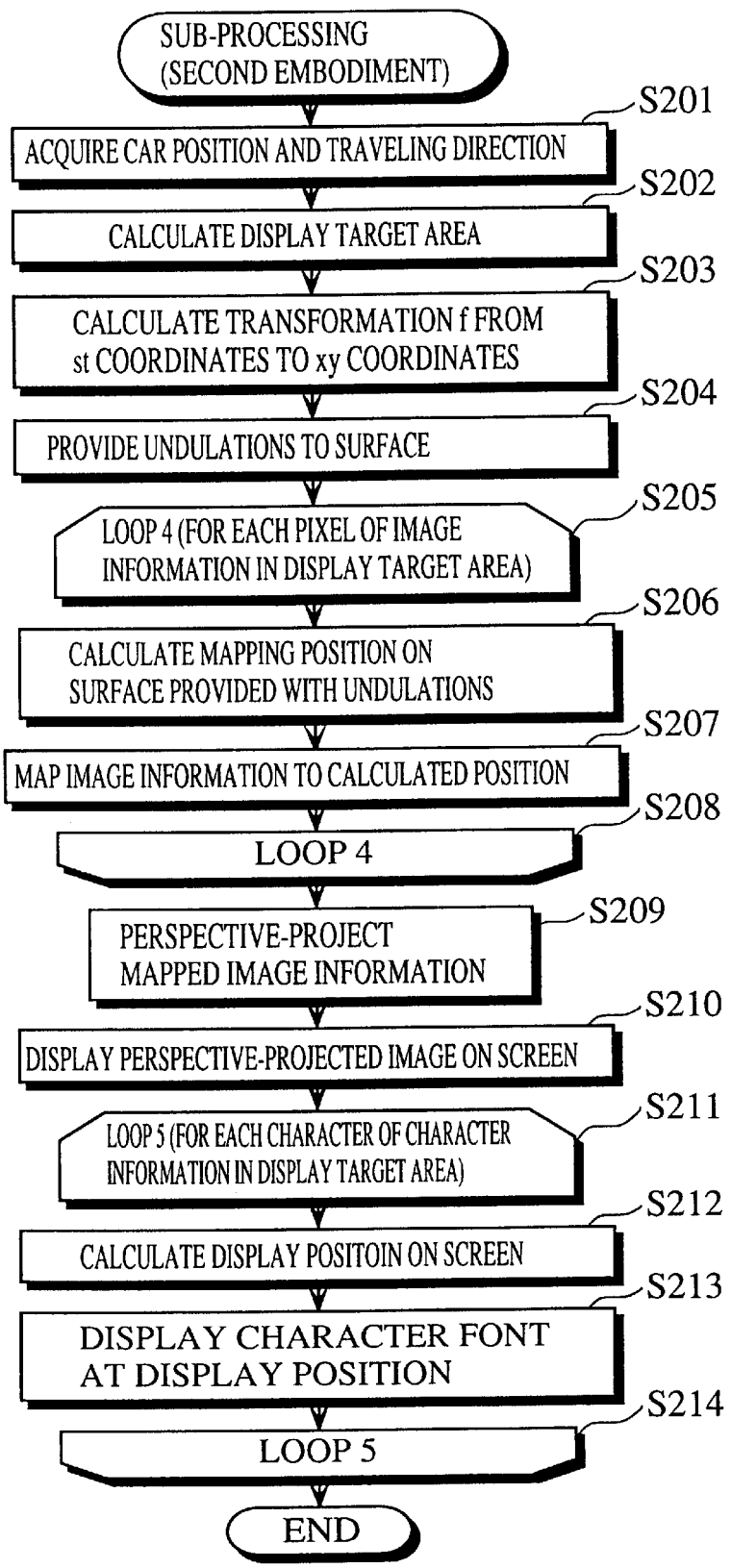
FIG. 23 is a flowchart showing sub-processing in the second embodiment.

A map display operation of the map display device 20 is explained below, with reference to FIG. 23.

The map display device 20 performs main processing and sub-processing, to display a map which gradually changes from one shape to another. In the main processing, surfaces are generated by gradually changing a shape of a surface to another shape, in accordance with the driver's operation. The sub-processing is called for each generated surface defined by corresponding surface definition information. In the sub-processing, after the surface defined by the surface definition information is deformed according to altitude information, a map is texture-mapped on the deformed surface, and the result is perspective-projected.

The main processing is the same as that in the first embodiment, so that its explanation is omitted here.

The sub-processing is performed in the following manner, using surface definition information of a surface specified in each of steps S022 and S024 in the main processing.

The positional information accepting unit 155 outputs the car positional information showing the car position and the traveling direction, to the mapping unit 160 (S201). The mapping unit 160 calculates the display target area based on the car position and the traveling direction (S202), and calculates the transformation f (S203).

The surface deforming unit 161 deforms the surface defined by the surface definition information, in accordance with altitude information which relates to the display target area (S204).

For first coordinate information showing a position of each pixel of the image information included in the display target area (S205), the mapping unit 160 calculates second coordinate information showing a position on the surface deformed by the surface deforming unit 161 (S206), and maps the pixel based on the calculated position (S207). The projecting unit 170 perspective-projects the image information mapped by the mapping unit 160, onto the flat virtual screen (S209).

The displaying unit 180 enlarges or contracts the perspective-projected image, and displays it on the whole display screen equipped therein (S210). Also, for each character string included in the display target area (S211), the displaying unit 180 calculates a display position on the display screen (S212), and displays character fonts of the character string at the display position (S213).

(Conclusion)

As described above, the map display device 20 sequentially generates surfaces by gradually changing a shape of a surface to a shape that corresponds to a position of a point of interest designated by the driver on a map, as in the first embodiment. Here, the surfaces are made up of curved surfaces having intermediate shapes between the former and latter shapes, and a surface having the latter shape. The map display device 20 then provides undulations corresponding to altitudes to each generated surface, texture-maps image information on each deformed surface, and perspective-projects the texture-mapped images. As a result, the map in which a desired portion is gradually enlarged or contracted while maintaining connections of roads can be displayed with a three-dimensional appearance.

Also, the map display device 20 prevents the display of character fonts from being ruined by texture mapping and perspective projection, as in the first embodiment.

Third Embodiment

The following is a description of a map display device 30 which is the third embodiment of the invention. The map display device 30 generates, gradually changing a shape of a surface to an intended shape that corresponds to a position of a point of interest designated by a driver on a map. The map display device 30 provides undulations corresponding to altitudes to each generated surface except a car position and its vicinity, texture-maps coordinate information showing the map onto each surface provided with undulations, and perspective-projects the texture-mapped coordinate information, before displaying the resulting projected images. In so doing, the map is displayed which has a desired portion gradually enlarged or contracted while maintaining connections of roads, and which has a three-dimensional appearance. The map display device 30 also prevents the display around the car position from being hidden by undulations. The same features as the second embodiment are omitted, so that the following explanation focuses on the differences with the second embodiment.

(Overall Construction)

Figure 24:
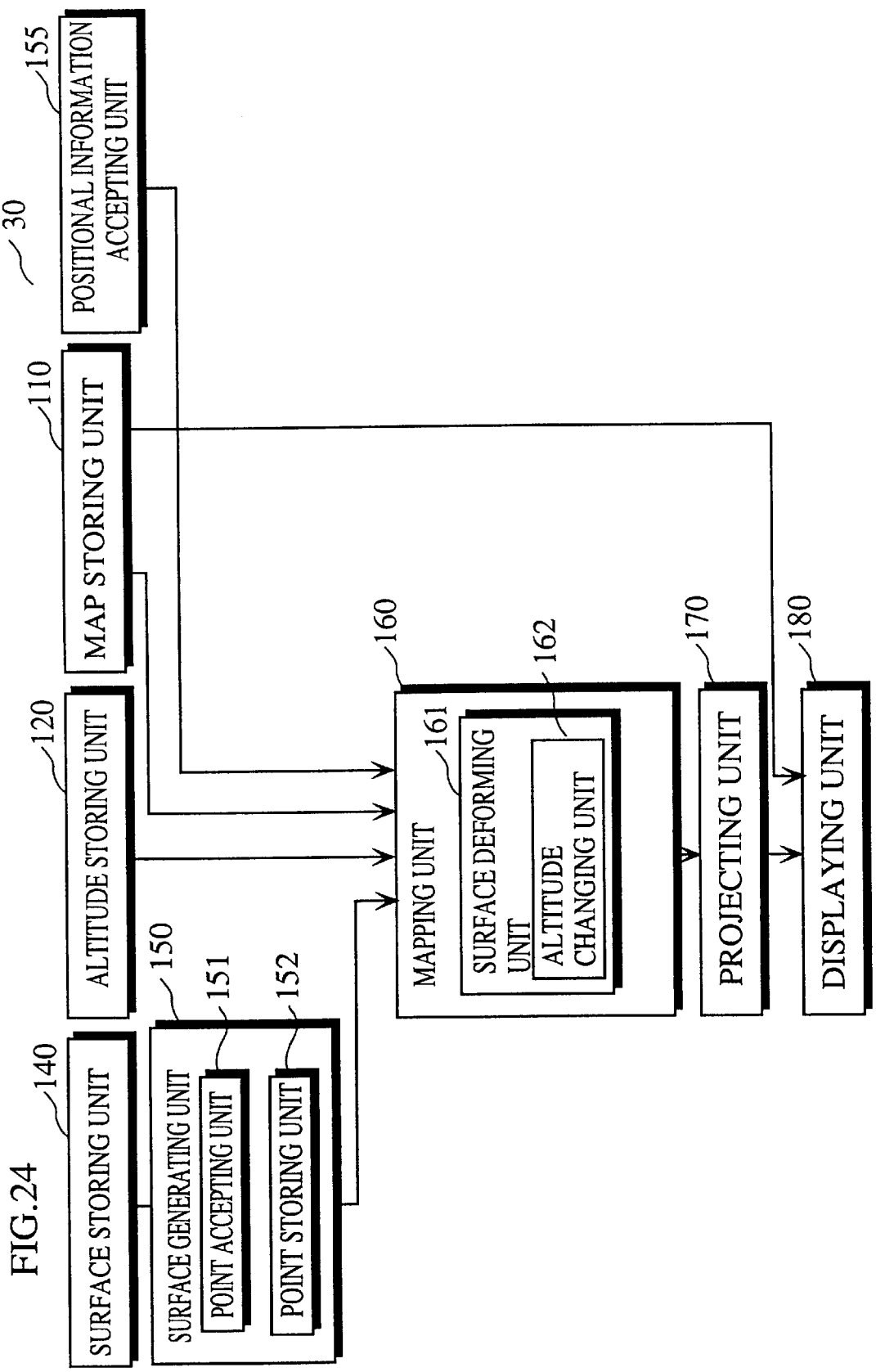
FIG. 24 is a block diagram showing a map display device according to the third embodiment of the invention.

As shown in FIG. 24, the surface deforming unit 161 includes an altitude changing unit 162, in the map display device 30 of the third embodiment.

(Surface Deforming Unit 161)

The surface deforming unit 161 deforms each surface output from the surface generating unit 150 in accordance with altitude information which has been changed by the altitude changing unit 162, and outputs the result to the mapping unit 160.

(Altitude Changing Unit 162)

The altitude changing unit 162 sets a flat area which contains the car position and its vicinity, changes altitudes of altitudes points in the flat area to a uniform value, and changes altitudes of altitudes points around the flat area according to their distances from the flat area. The details are explained below.

The altitude changing unit 162 calculates a rectangular area which is a part of the display target area and which contains the car position, as the flat area. As an example, the altitude changing unit 162 calculates an area having a range of 5 km ahead of the car and 1 km to both the left and the right.

The altitude changing unit 162 changes altitudes of all altitude points in the flat area, to the lowest altitude value hlow in the flat area.

The altitude changing unit 162 then uses a function $q(d) = d (0 < d \leq 1), 1 (1 < d)$ of a distance d from the flat area, to change an altitude h of an altitude point which is at a distance d0 from the flat area, to hlow+q(d0)×(h−hlow)

Figure 25:
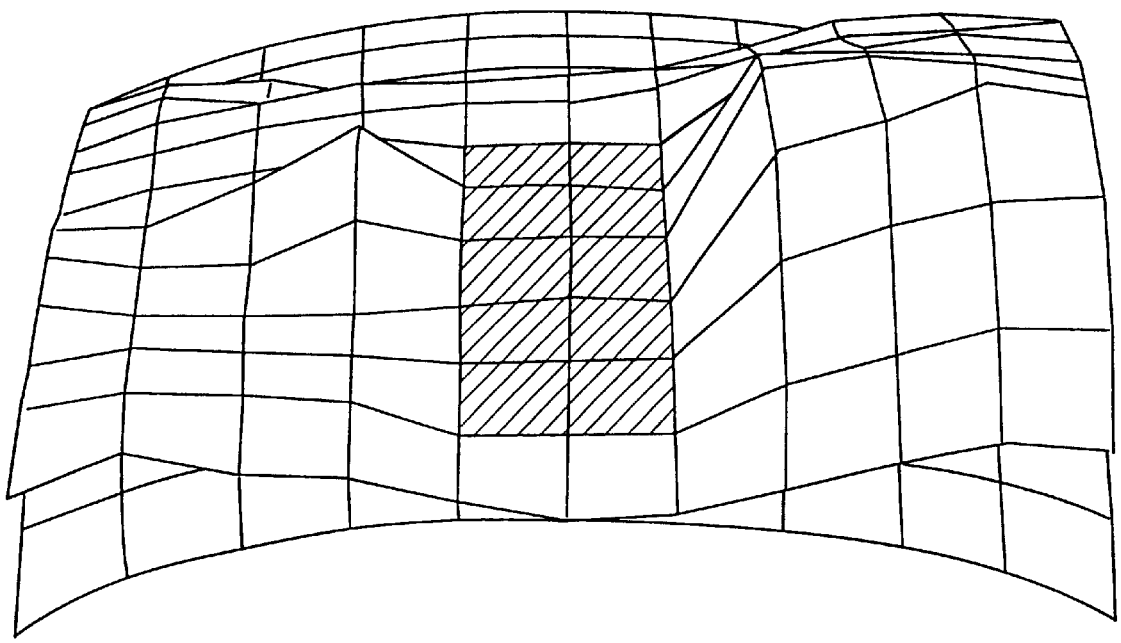
FIG. 25 shows an example of a curved surface deformed by a surface deforming unit shown in FIG. 24.

FIG. 25 shows an example surface deformed by the surface deforming unit 161 using the changed altitude information. In the drawing, a diagonally shaded region is the flat area. Since altitudes of altitude points in the flat area have been changed to the uniform value, no undulations are seen in this area. This suppression of undulations is gradually removed around the flat area, in accordance with distances from the flat area.

Figure 26:
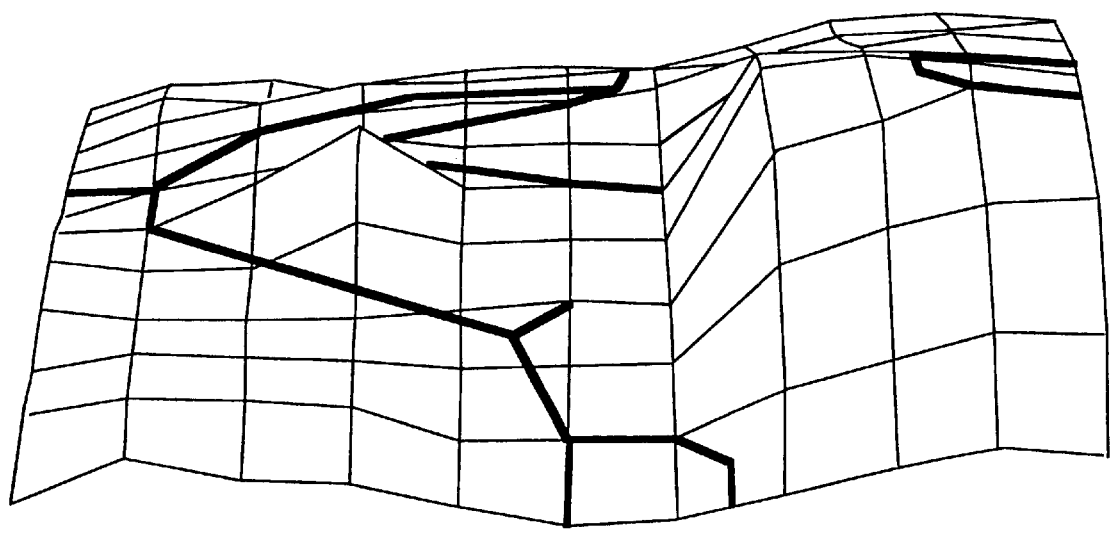
FIG. 26 shows an example of image information mapped by a mapping unit shown in FIG. 24.
Figure 27:
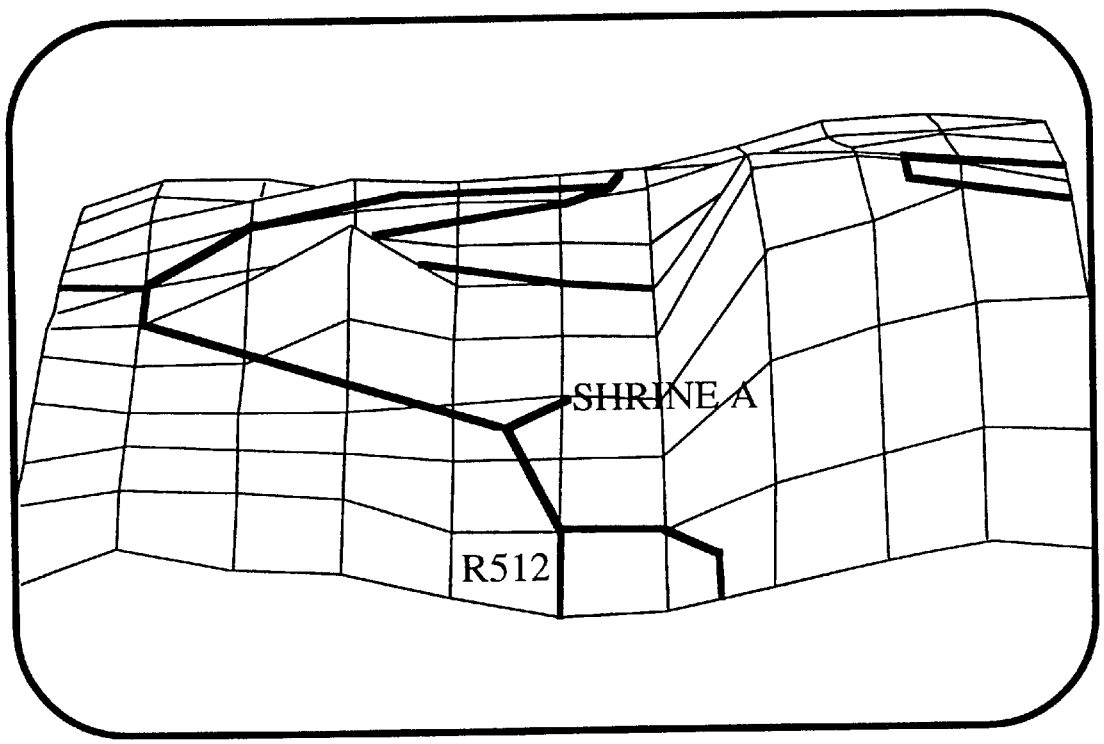
FIG. 27 shows an example map displayed by a displaying unit shown in FIG. 24.

FIG. 26 shows an example mapping result by the mapping unit 160, on the deformed surface shown in FIG. 25. FIG. 27 shows an example display by the displaying unit 180, for an image obtained by perspective-projecting the mapping result of FIG. 26 by the projecting unit 170.

Thus, the map display device 30 suppresses the provision of undulations in the flat area, so that roads existing directly ahead of the car can be displayed without being obstructed by mountains and the like. The effect achieved by this construction is remarkable, when compared with the example display shown in FIG. 22 in the second embodiment.

(Map Display Operation)

Figure 28:
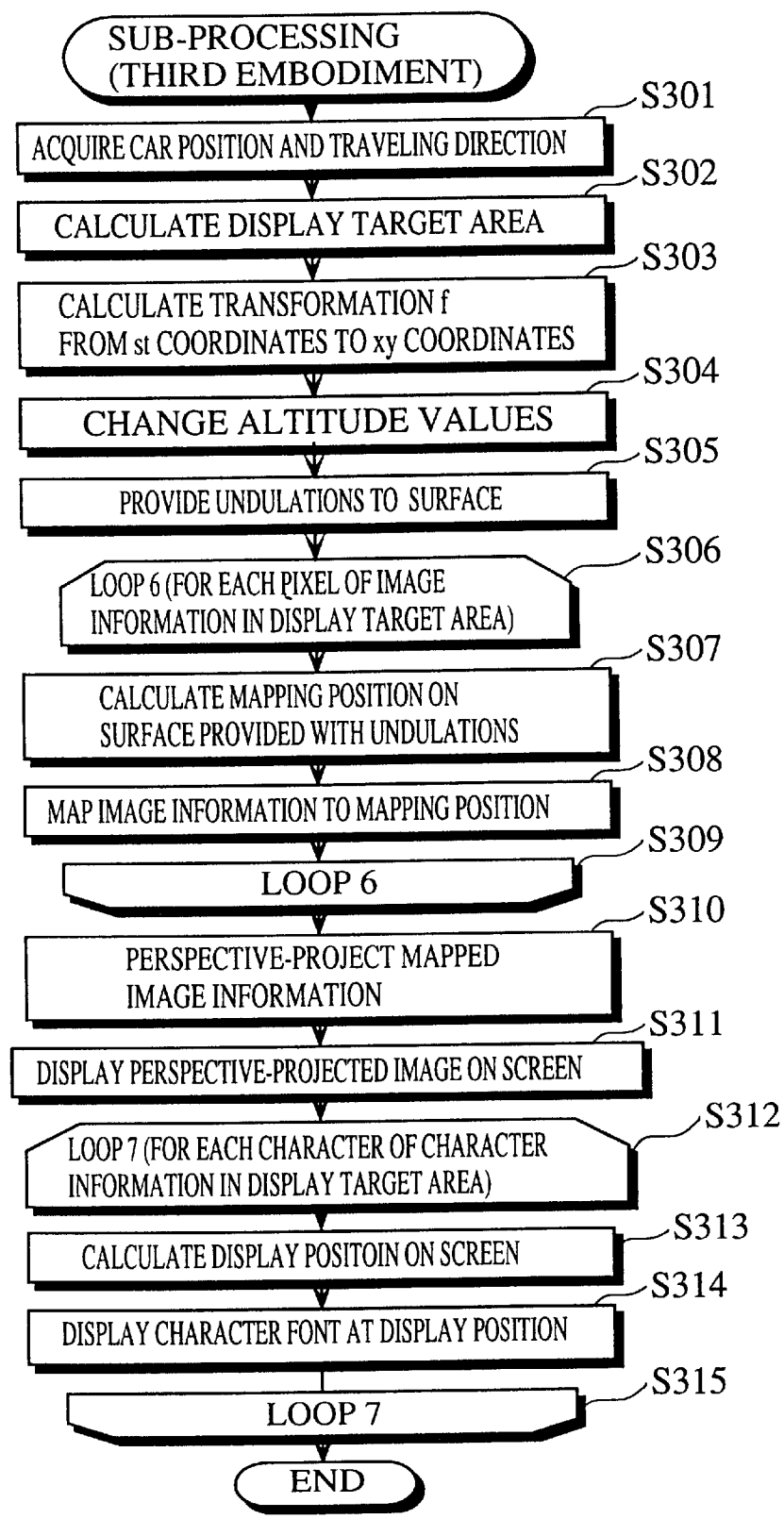
FIG. 28 is a flowchart showing sub-processing in the third embodiment.

A map display operation of the map display device 30 is explained below, with reference to FIG. 28.

The map display device 30 performs main processing and sub-processing, to display a map which gradually changes from one shape to another. In the main processing, surfaces are generated by changing a shape of a surface to another shape, according to the driver's operation. The sub-processing is called for each generated surface defined by corresponding surface definition information. In the sub-processing, after the surface defined by the surface definition information is deformed using altitude information which has been altered so as to render the area containing the car position and its vicinity flat, a map is texture-mapped onto the deformed surface, and the result is perspective-projected.

The main processing is the same as that in the first embodiment, so that its explanation is omitted here.

In the sub-processing, the positional information accepting unit 155 outputs the car positional information showing the car position and the traveling direction, to the mapping unit 160 (S301) The mapping unit 160 calculates the display target area based on the car position and the traveling direction (S302), and calculates the transformation f (S303).

The altitude changing unit 162 changes the altitudes in the flat area to the uniform value, and changes the altitudes in the vicinity of the flat area in accordance with the distances from the flat area (S304).

The surface deforming unit 161 deforms the surface defined by the surface definition information, according to the altitude information changed by the altitude changing unit 162 (S305).

For first coordinate information showing a position of each pixel of the image information included in the display target area (S306), the mapping unit 160 calculates second coordinate information showing a position on the surface deformed by the surface deforming unit 161 (S307), and maps the pixel based on the calculated position (S308). The projecting unit 170 perspective-projects the image information mapped by the mapping unit 160, onto the virtual screen (S310).

The displaying unit 180 enlarges or contracts the perspective-projected image, and displays it on the whole display screen equipped therein (S311). Also, for each character string included in the display target area (S312), the displaying unit 180 calculates a display position on the display screen (S313), and displays character fonts of the character string at the display position (S314).

(Conclusion)

As described above, the map display device 30 sequentially generates surfaces by gradually changing a shape of a surface to a shape that corresponds to a position of a point of interest designated by the driver on a map, as in the first embodiment. Here, the surfaces are made up of curved surfaces having intermediate shapes between the former and latter shapes, and a surface having the latter shape. The map display device 30 provides undulations corresponding to altitudes to each generated surface except the car position and its vicinity, texture-maps image information on each deformed surface, and perspective-projects the texture-mapped images. As a result, the map can be displayed which has a desired portion gradually enlarged or contracted while maintaining connections of roads, and which has a three-dimensional appearance. Also, since the display of undulations around the car position is suppressed, the map display around car position is kept from being obstructed by such undulations.

Further, the map display device 30 prevents the display of character fonts from being ruined by texture mapping and perspective projection, as in the first embodiment.

Fourth Embodiment

The following is a description of a map display device 40 which is the fourth embodiment of the invention. The map display device 40 generates surfaces, by gradually changing a shape of a surface to an intended shape that corresponds to a position of a point of interest designated by a driver on a map. The map display device 40 perspective-projects coordinate information showing the map onto each virtual screen expressed by a different one of the generated surfaces, projects the perspective-projected images onto a display screen, and displays them. As a result, the map is displayed with a portion including the point of interest gradually enlarged or contracted, while maintaining connections of roads. The same features as those in the first embodiment are omitted, and the following explanation focuses on the differences with the first embodiment.

(Overall Construction)

As shown in FIG. 29, the map display device 40 includes a map storing unit 210, a surface storing unit 240, a surface generating unit 250, a positional information accepting unit 255, a projecting unit 270, and a displaying unit 280.

(Map Storing Unit 210)

The map storing unit 210 is the same as the map storing unit 110 in the first embodiment, and stores image information expressed in bitmap data, character information including character strings, and first coordinate information showing a position of each pixel and character string.

(Surface Storing Unit 240)

The surface storing unit 240 stores surface definition information defining a plurality of different surfaces which exist within a virtual space and which are each used as a virtual screen for perspective projection. Here, the virtual space is expressed using the three-dimensional orthogonal coordinate system called "xyz coordinate system", as in the first embodiment.

In more detail, the surface storing unit 240 stores surface definition information defining a curved surface in which an angle between a part of the curved surface to which a map portion to be enlarged is perspective-projected and a line of sight in perspective projection is smaller than any angles between the other parts of the curved surface and lines of sight, in association with information showing a part of the display screen corresponding to the map portion. The surface storing unit 240 also stores surface definition information defining a curved surface in which an angle between a part of the curved surface to which a map portion to be contracted is perspective-projected and a line of sight in perspective projection is larger than any angles between the other parts of the curved surface and lines of sight, in association with information showing a part of the display screen corresponding to the map portion. The effect of enlarging/contracting a map portion in accordance with a shape of a curved surface is detailed in the description of the projecting unit 270.

The surface storing unit 240 further stores surface definition information of a flat surface which does not have the effect of enlarging/contracting any map portion.

Surface definition information is stored in the surface storing unit 240 in one of the following forms, as in the first embodiment.

① A surface expressed by a relationship equation of x, y, and z.

② A surface obtained by interpolating a plurality of sample points on the surface.

③ A surface obtained by expressing the x, y, and z coordinates of a point on the surface using parameters u and v.

Figure 30A:
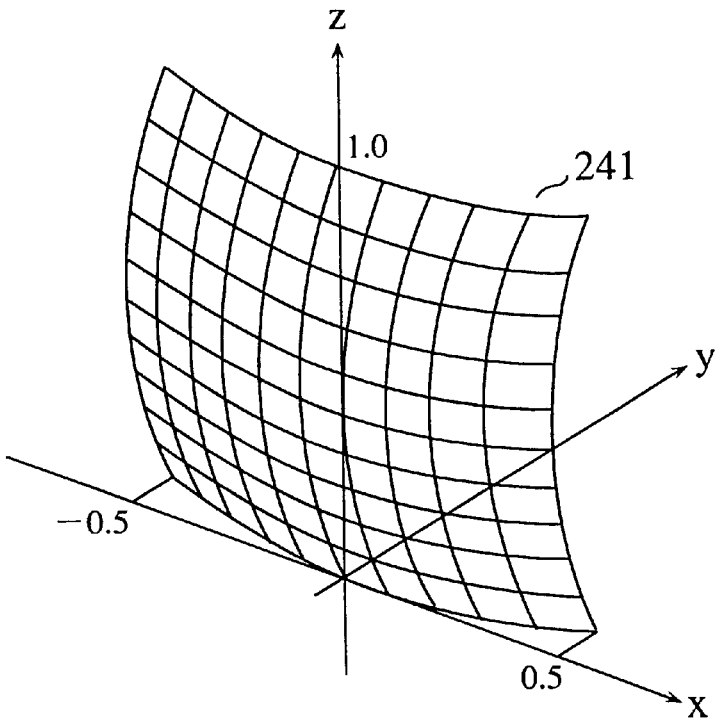
FIGS. 30A–B shows examples of curved surfaces stored in a surface storing unit shown in FIG. 29.
Figure 30B:
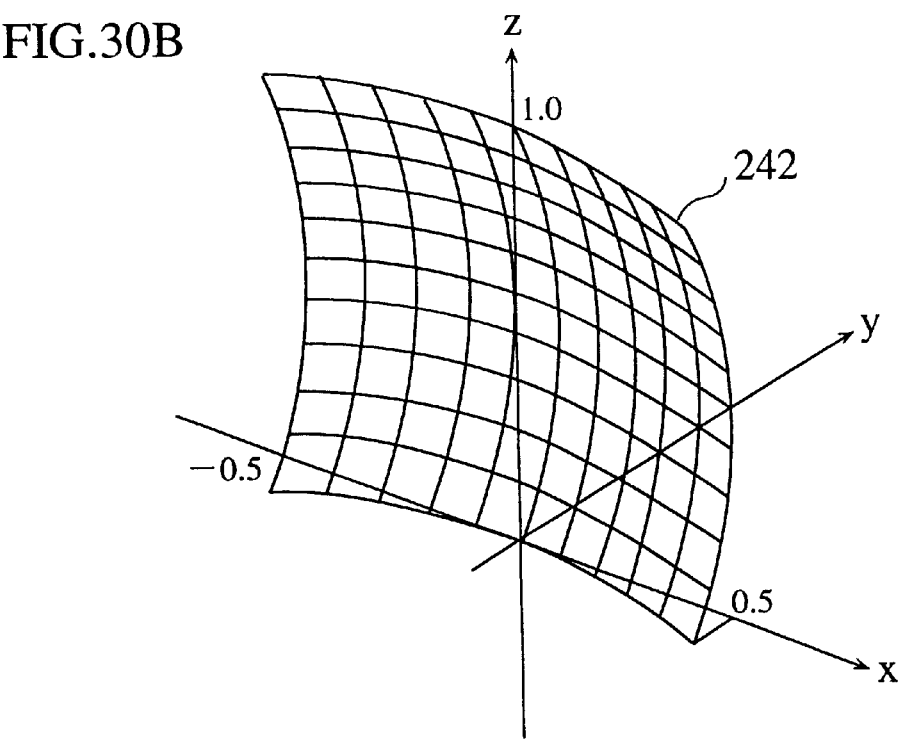

FIGS. 30A and 30B each show an example curved surface defined by surface definition information stored in the surface storing unit 240. FIG. 30A shows a curved surface 241 expressed by a relationship equation $$x^2+(y-1)^2+(z-0.5)^2=1.25$$

whereas FIG. 30B shows a curved surface 242 expressed by a relationship equation $$x^2+(y-1)^2+(z-0.5)^2=1.25$$

Both surfaces are shown in the range of $-0.5 \leq x \leq 0.5$ and $0 \leq z \leq 1$. To facilitate the understanding of the shape of each curved surface, geodesic lines are provided in 0.1 intervals for both of the x and y coordinates. The curved surface 241 enlarges a nearer portion of a map, whereas the curved surface 242 enlarges a farther portion of a map. The nearer portion and farther portion of the map correspond to the lower part and upper part of the display screen, respectively.

In the surface storing unit 240, surface definition information of each surface is stored in a surface definition information field, while information showing a part of the display screen corresponding to a map portion to be enlarged/contracted is stored in an enlarged/contracted portion field, as in the surface storing unit 140 shown in FIG. 5.

Note that the surface storing unit 240 may instead store the surface definition information in the above form ② or ③ (not illustrated)

(Surface Generating Unit 250)

The surface generating unit 250 generates curved surfaces by gradually changing a surface from one shape to another, according to the driver's operation. Here, each curved surface has an intermediate shape between the two shapes. The surface generating unit 250 then outputs surface definition information defining each curved surface, to the projecting unit 270.

The surface generating unit 250 includes a point accepting unit 251 and a point storing unit 252.

The point accepting unit 251 is the same as the point accepting unit 151 in the first embodiment. The point accepting unit 251 notifies the surface generating unit 250 of a position of a point of interest designated by the driver on the screen, and a designation of enlargement or contraction.

The point storing unit 252 has a previous point field and a current point field, like the point storing unit 152 shown in FIG. 6. Initially, information showing that no point of interest is designated is stored in both fields.

The surface generating unit 250 is notified by the point accepting unit 251 of the position of the point of interest on the screen and the designation of enlargement/contraction. The surface generating unit 250 updates the contents of the point storing unit 252, and generates curved surfaces by gradually changing the shape of the previous surface to the shape of the current surface.

The surface generating unit 250 outputs surface definition information of each of the generated curved surfaces, to the projecting unit 270 in sequence. The surface generating unit 250 lastly outputs surface definition information of the current surface to the projecting unit 270.

Since this operation of the surface generating unit 250 is similar to that of the surface generating unit 150 in the first embodiment, its detailed explanation has been omitted here.

Figure 31:
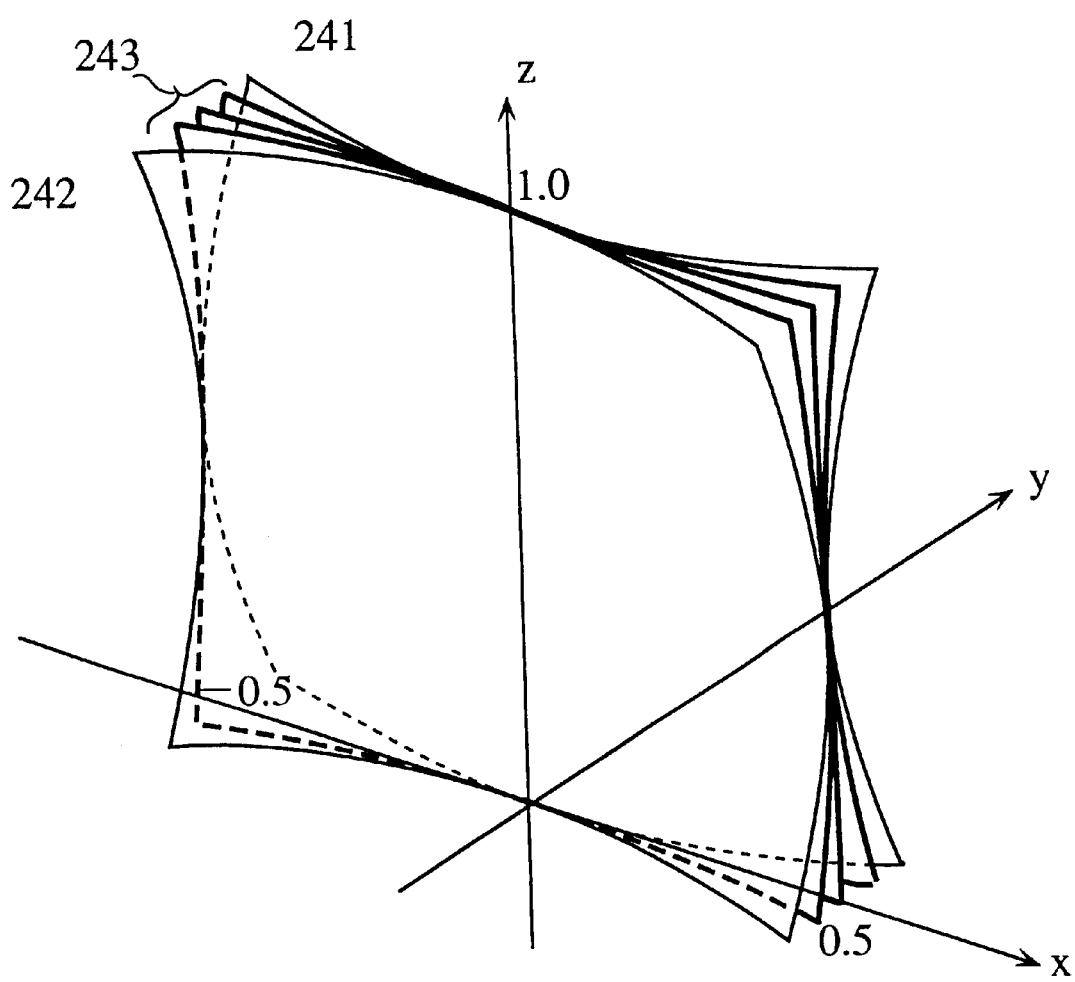
FIG. 31 shows example shapes of surfaces output from a surface generating unit shown in FIG. 29.

FIG. 31 is a conceptual diagram showing an example of surfaces which are output from the surface generating unit 250 when the driver, who has designated a point of interest located at the lower part of the display screen as the enlargement target, newly designates a point of interest located at the upper part of the display screen as the enlargement target.

In this example, the surface generating unit 250 sets the curved surface 241 for enlarging the lower part of the display screen as the previous surface, and the curved surface 242 for enlarging the upper part of the display screen as the current surface. The surface generating unit 250 sequentially generates curved surfaces 243 which each assume an intermediate shape between the shapes of the curved surfaces 241 and 242, and outputs surface definition information of each generated curved surface to the projecting unit 270. The surface generating unit 250 then outputs surface definition information of the curved surface 242 to the projecting unit 270.

(Positional Information Accepting Unit 255)

The positional information accepting unit 255 accepts car positional information relating to a current position and traveling direction of a car in which the map display device 40 is mounted, from an outside device such as a GPS or inertial navigation device. The positional information accepting unit 255 then outputs the car positional information to the projecting unit 270. The structure of the car positional information is the same as that in the first embodiment.

(Projecting Unit 270)

The projecting unit 270 calculates a display target area based on the car positional information received from the positional information accepting unit 255, and perspective-projects image information included in the display target area onto each surface which is output from the surface generating unit 250 as a virtual screen. The details are explained below.

The projecting unit 270 calculates a rectangular area including the car position as the display target area, as in the first embodiment. FIG. 9 shows an example of the calculated area.

The projecting unit 270 then computes a coordinate transformation which associates first coordinate information showing a position of each pixel of the image information included in the display target area, with the xy coordinates of the virtual space. This transformation is composed of parallel translation and rotation in accordance with the car position and traveling direction, and contraction. The projecting unit 270 calculates the transformation f, based on the parallel translation amount and the rotation amount in accordance with the car position and traveling direction, and the contraction ratio.

Figure 32:
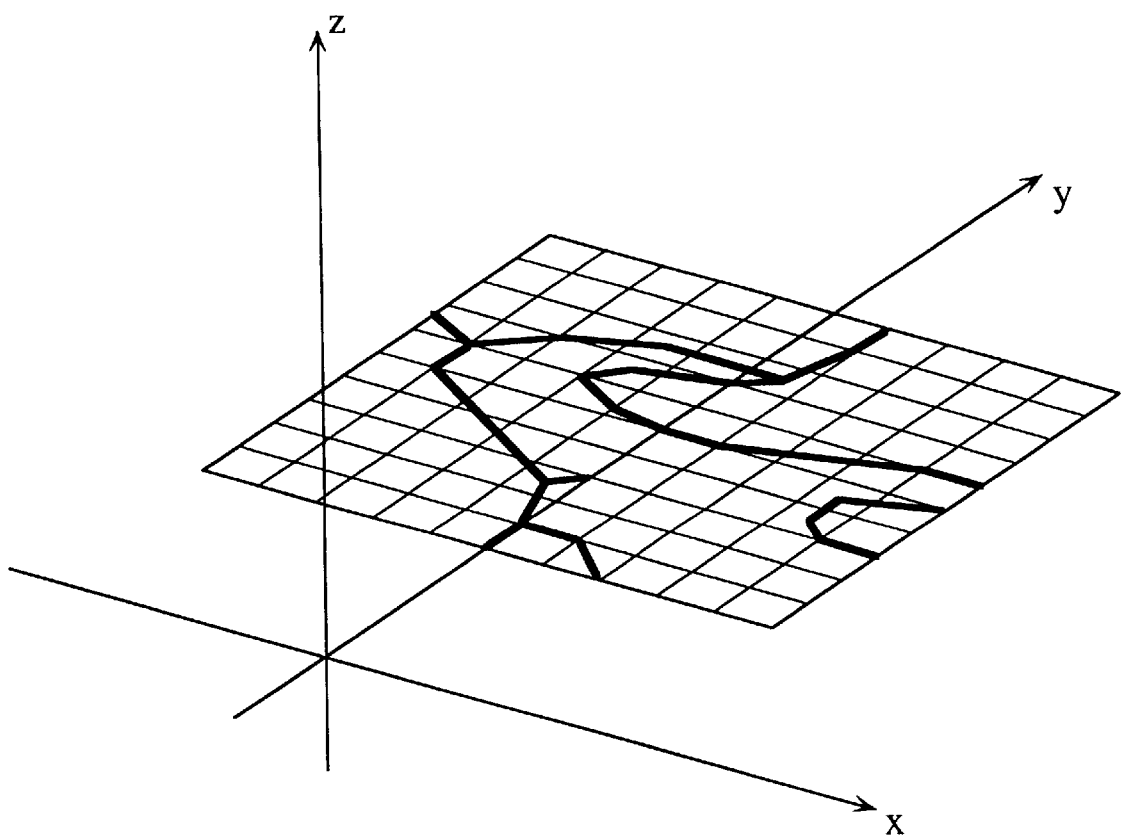
FIG. 32 shows an example of image information positioned within a virtual space for perspective projection.

FIG. 32 shows example image information which is obtained by coordinate-transforming the image information included in the display target area of FIG. 9 using the transformation f, and positioning the transformed image information in the virtual space.

For example, when the first coordinate information is (s0,t0), the projecting unit 270 calculates the position (f(s0, t0),0) in the virtual space using the transformation f, and calculates the second coordinate information that shows a point where the line of sight which is directed to the calculated position intersects with the virtual screen. The projecting unit 270 then perspective-projects the image information based on the position shown by the second coordinate information.

Figure 33A:
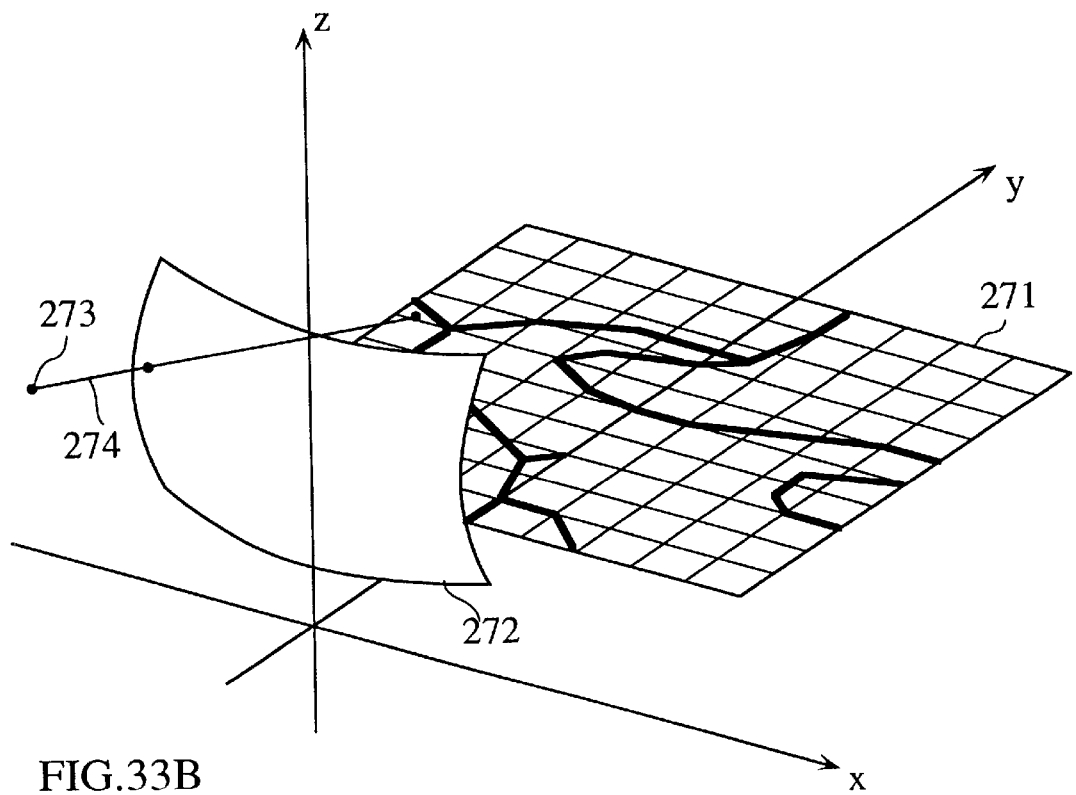
FIG. 33A is a conceptual view for explaining perspective projection performed by a projecting unit shown in FIG. 29.

FIG. 33A is a conceptual diagram showing the perspective projection which is performed by the projecting unit 270 on the virtual screen shown in FIG. 30A, where the positional relations between a flat surface 271, a virtual screen 272, an eyepoint 273, and a line of sight 274 are shown. In the same manner as the conventional map display using the law of perspective, the projecting unit 270 virtually positions the eyepoint 273 before the flat surface 271 in the traveling direction at an appropriate height, and positions the virtual screen 272 so as to provide appropriate vision. This being so, an image projected on the virtual screen 272 is analogous to a view when an actual geographic area is looked at from the sky. This provides a realistic map to the driver and helps him or her comprehend the perspective.

Figure 33B:
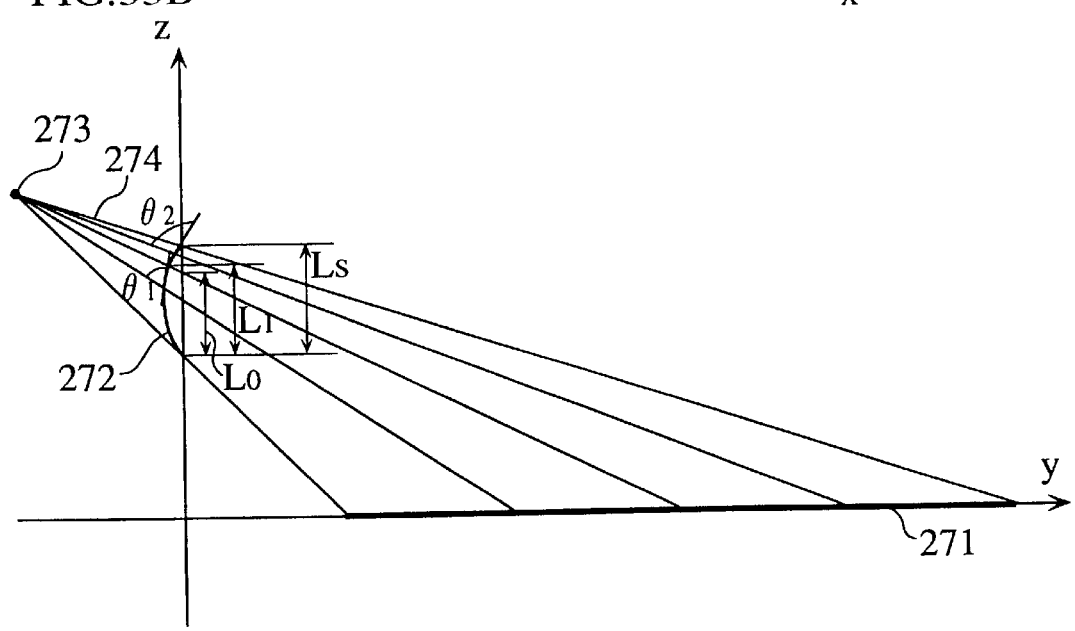
FIG. 33B is a sectional view of FIG. 33A where x=0.

FIG. 33B is a sectional view of FIG. 33A where x=0. In the drawing, Ls is the height of the virtual screen 272, and L1 is the length at which the nearer half of the flat surface 271 in the traveling direction is projected on the virtual screen 272. Also, to compare with the case where no map portion is enlarged, the length at which the nearer half of the flat surface 271 in the traveling direction is projected on a flat virtual screen having the same range as the virtual screen 272 in x and z coordinates is shown by L0.

As can be seen from the drawing, the virtual screen 272 intersects a line of sight directed to a nearer part of the flat surface 271 in the traveling direction at a small angle θ1, and intersects a line of sight directed to a farther part of the flat surface 271 in the traveling direction at a large angle θ2. Regarding a same-size part of the flat surface 271, the smaller an angle formed between the virtual screen and a line of sight, the larger an area perspective-projected on the virtual screen is. Therefore, in the image obtained by perspective-projecting the map onto the virtual screen 272, near-by areas are enlarged and distant areas are contracted. This is also clear from L0<L1.

Figure 34A:
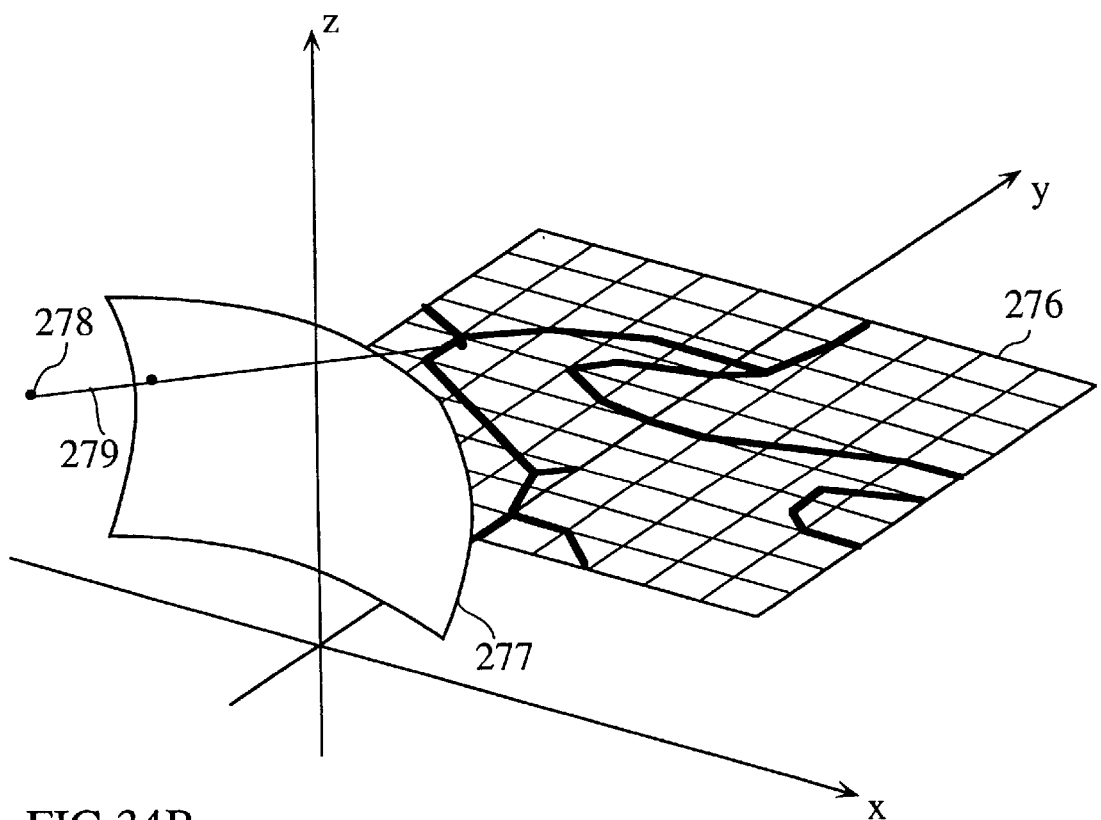
FIG. 34A is a conceptual view for explaining perspective projection performed by the projecting unit.

FIG. 34A is a conceptual diagram showing the perspective projection on the virtual screen of FIG. 30B, where reference numeral 276 is a flat surface, 277 a virtual screen, 278 an eyepoint, and 279 a line of sight. Their positioning and the effects achieved by it are as described above.

Figure 34B:
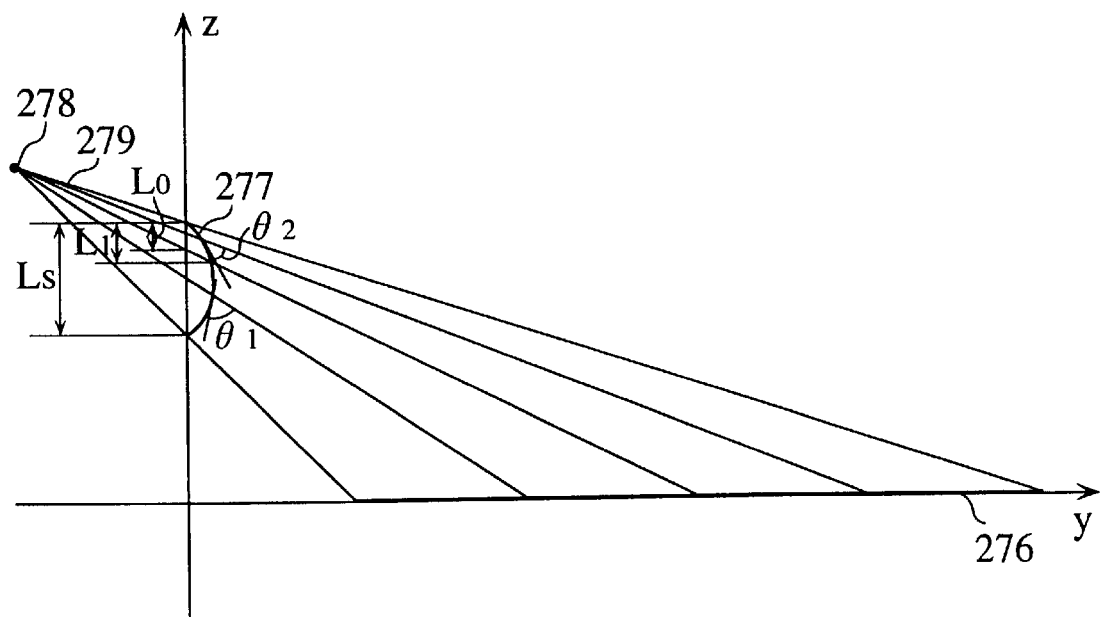
FIG. 34B is a sectional view of FIG. 34A where x=0.

FIG. 34B is a sectional view of FIG. 34A where x=0. In the drawing, Ls denotes the height of the virtual screen 277, L1 denotes the length at which the farther half of the flat surface 276 in the traveling direction is projected on the virtual screen 277, and L0 denotes the length at which the farther half of the flat surface 276 is projected on a flat virtual screen having the same range as the virtual screen 277 in x and z coordinates.

The virtual screen 277 intersects a line of sight which is directed to a nearer part of the flat surface 276 in the traveling direction at a large angle θ1, and intersects a line of sight which is directed to a farther part of the flat surface 276 in the traveling direction at a small angle θ2. Accordingly, in the image obtained by perspective-projecting the map onto the virtual screen 277, near-by areas are contracted while distant areas are enlarged. This is also clear from L0<L1.

Thus, a curved surface is designed such that an angle formed between a part of the curved surface to which a map portion to be enlarged is perspective-projected and a line of sight in perspective projection is smaller than angles formed between other parts of the curved surface and lines of sight, or such that an angle formed between a part of the curved surface to which a map portion to be contracted is perspective-projected and a line of sight in perspective projection is larger than angles formed between other parts of the curved surface and lines of sight. By perspective-projecting image information onto such a curved surface, a map can be displayed with a desired portion enlarged or contracted, while maintaining connections of roads.

For each surface output from the surface generating unit 250, the projecting unit 270 perspective-projects the image information onto a virtual screen represented by the surface. Suppose the previous surface is the virtual screen 272 of FIG. 33 and the current surface is the virtual screen 277 of FIG. 34, according to the driver's operation. Then the surface generating unit 250 sequentially outputs curved surfaces which each assume an intermediate shape between the shapes of the virtual screens 272 and 277. The projecting unit 270 perspective-projects the image information included in the display target area, sequentially onto virtual screens represented by the curved surfaces. In this way, projected images which show a gradual change from an image with a nearer map portion enlarged to an image with a farther map portion enlarged are output from the projecting unit 270.

(Displaying Unit 280)

The displaying unit 280 is equipped with a display screen realized by a liquid crystal panel, a cathode-ray tube, a plasma panel, an EL panel, or similar, and displays the character information and each of the perspective-projected images on the display screen. The details are explained below.

The displaying unit 280 projects an image perspective-projected on each virtual screen, onto the display screen, and displays it.

The displaying unit 280 also calculates, for each character string included in the display target area, a point on the virtual screen to which a point (f(s0,t0),0) obtained by expressing a character position (s0,t0) in the xyz coordinate system is perspective-projected. The displaying unit 280 further calculates a point on the display screen to which the point on the virtual screen is projected, and displays character fonts of the character string centered on the calculated point on the display screen.

Thus, the map display device 40 keeps the display of the character fonts from being spoiled by perspective projection, as in the first embodiment.

(Map Display Operation)

Figure 35:
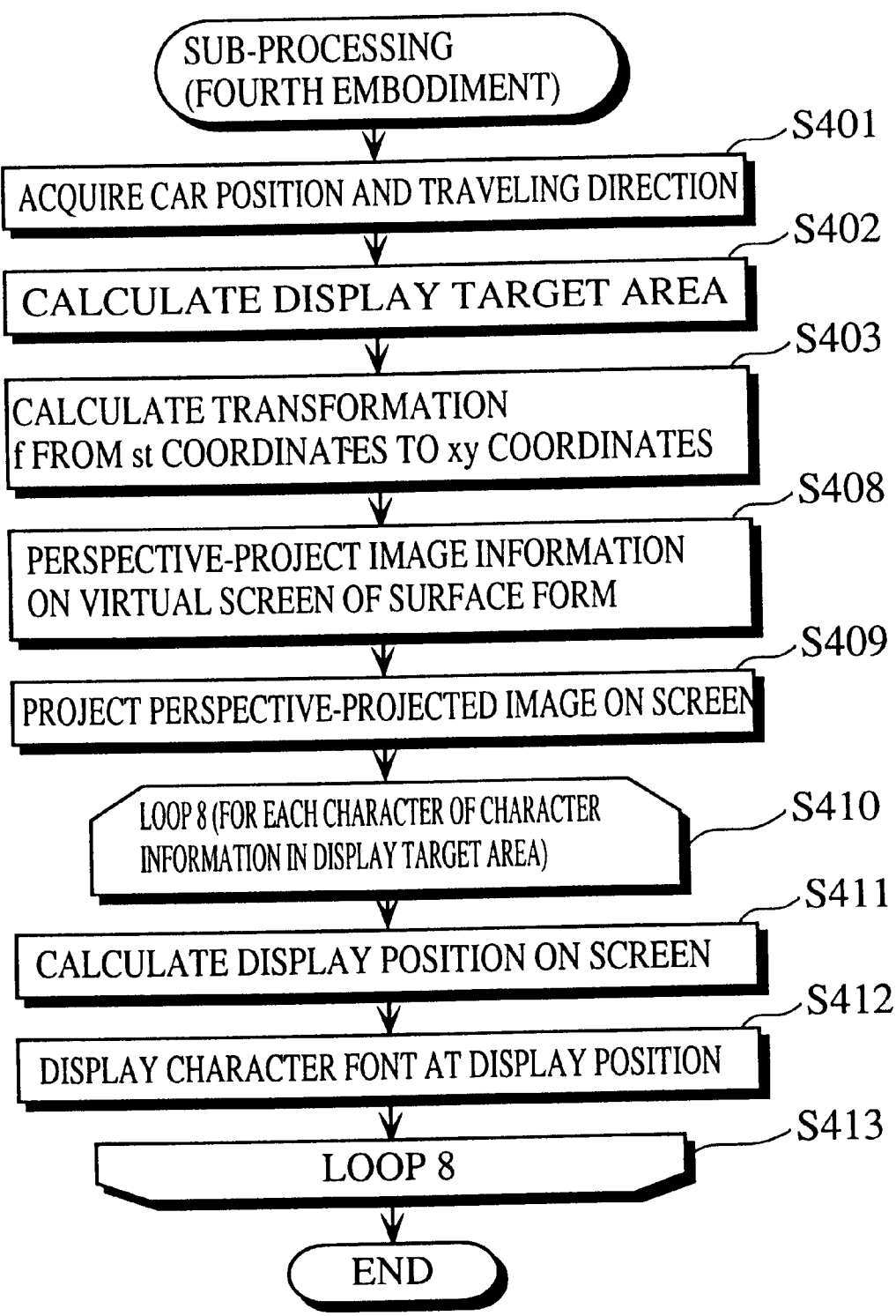
FIG. 35 is a flowchart showing sub-processing in the fourth embodiment.

A map display operation of the map display device 40 is explained below, with reference to FIG. 35.

The map display device 40 performs main processing and sub-processing, to display a map which gradually transforms from one shape to another. In the main processing, surfaces are generated by gradually changing a shape of a surface to another shape, in accordance with the driver's operation. The sub-processing is called for each generated surface defined by corresponding surface definition information. In the sub-processing, image information is perspective-projected on a virtual screen represented by the surface defined by the surface definition information.

The main processing is the same as that in the first embodiment, so that its explanation is omitted here.

In the sub-processing, the positional information accepting unit 255 outputs the car positional information showing the car position and the traveling direction, to the projecting unit 270 (S401). The projecting unit 270 calculates the display target area based on the car position and the traveling direction (S402), and calculates the transformation f from st coordinates to xy coordinates of the virtual space (S403).

For first coordinate information showing a position of each pixel of the image information included in the display target area, the projecting unit 270 calculates a position in the virtual space using the transformation f. The projecting unit 270 then calculates second coordinate information showing a point where the line of sight directed to the calculated position intersects with the virtual screen defined by the surface definition information, and perspective-projects the image information onto the virtual screen based on the position shown by the second coordinate information (S408).

The displaying unit 280 projects the perspective-projected image onto the display screen equipped therein, and displays it (S409). Also, for each character string included in the display target area (S410), the displaying unit 280 calculates a display position on the display screen (S411), and displays character fonts of the character string at the display position (S412).

(Conclusion)

As described above, the map display device 40 sequentially generates surfaces by gradually changing a shape of a surface to a shape that corresponds to a position of a point of interest designated by the driver on a map. Here, the generated surfaces are made up of curved surfaces having intermediate shapes between the former and latter shapes, and a surface having the latter shape. The map display device 40 then perspective-projects image information onto each generated surface as a virtual screen, and projects the perspective-projected images on the display screen. As a result, the map in which a desired portion is gradually enlarged or contracted can be displayed, while maintaining connections of roads.

Here, the map display device 40 generates surfaces by changing a shape of a surface to such a shape where an angle formed between a part of the surface to which a map portion including the point of interest is perspective-projected and a line of sight in perspective projection is smaller than any angles formed between other parts of the surface and lines of sight. Using such generated surfaces, the point of interest and its vicinity can be gradually enlarged on the display screen.

Also, the map display device 40 generates surfaces by changing a shape of a surface to such a shape where an angle formed between a part of the surface to which a map portion including the point of interest is perspective-projected and a line of sight in perspective projection is larger than any angles formed between other parts of the surface and lines of sight. Using such generated surfaces, the point of interest and its vicinity can be gradually contracted on the display screen.

Meanwhile, the map display device 40 keeps the display of character fonts from being ruined by perspective projection, as in the first embodiment.

Fifth Embodiment

The following is a description of a map display device 50 which is the fifth embodiment of the invention. The map display device 50 generates surfaces, by gradually changing a shape of a surface to an intended shape that corresponds to a position of a point of interest designated by a driver on a map. The map display device 50 provides undulations corresponding to altitudes to coordinate information showing the map, perspective-projects the coordinate information provided with the undulations onto each generated surface used as a virtual screen, and projects the perspective-projected coordinate information onto a display screen, before displaying the resulting images. By doing so, the map is displayed that has a desired portion gradually enlarged or contracted while maintaining connections of roads, and that has a three-dimensional appearance. The same features as the first, second, and fourth embodiments are omitted, so that the following explanation focuses on the differences with these embodiments.

(Overall Construction)

Figure 36:
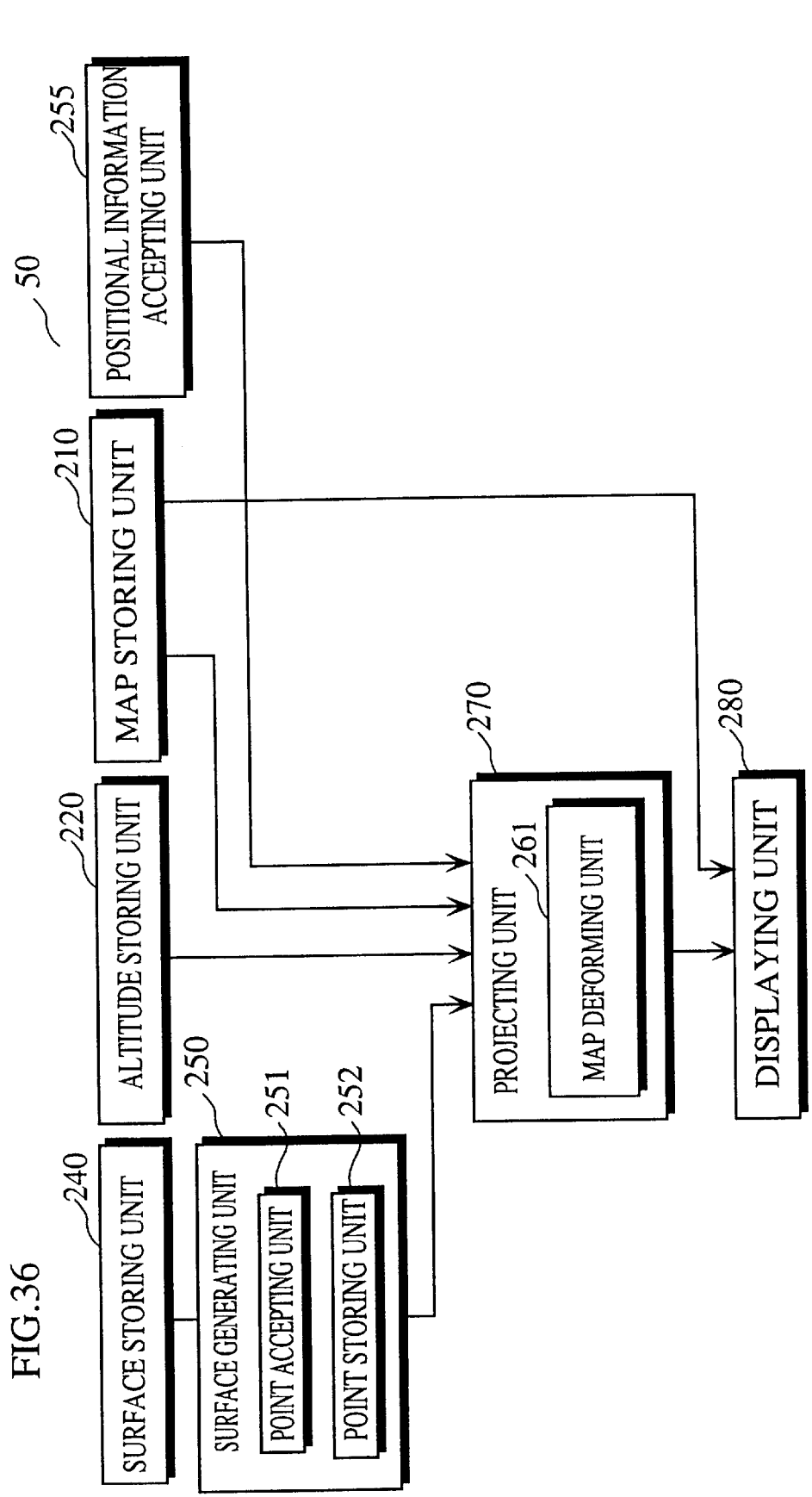
FIG. 36 is a block diagram showing a map display device according to the fifth embodiment of the invention.

As shown in FIG. 36, the map display device 50 includes the construction elements of the map display device 40 of the fourth embodiment, and further includes an altitude storing unit 220. Also, the projecting unit 270 includes a map deforming unit 261.

(Altitude Storing Unit 220)

The altitude storing unit 220 is the same as the altitude storing unit 120 in the second embodiment. The altitude storing unit 220 has the altitude table 121 shown in FIG. 19, and stores a position and an altitude for each altitude point.

(Map Deforming Unit 261)

The map deforming unit 261 is notified by the projecting unit 270 of the display target area, and changes the first coordinate information showing the position of each pixel of the image information included in the display target area, by adding altitudes according to the altitude information to the first coordinate information. The map deforming unit 261 then outputs the result to the projecting unit 270. The details are explained below.

For each altitude point included in the display target area, the map deforming unit 261 changes first coordinate information (s0,t0) of the altitude point to ((s0,t0),ah), by adding the result of multiplying an altitude h by a constant a to the first coordinate information. The map deforming unit 261 then notifies the projecting unit 270 of the calculated point. Here, the constant a is a scale for altitudes in the xyz coordinate system, and also represents the degree of emphasis on undulations. In other words, the greater the value of a, the more emphasis is placed on undulations.

Here, as in the second embodiment, the difference with the mean or minimum value of the altitude values included in the display target area may be set ash. Also, when there is no altitude point at the position shown by the first coordinate information (s0,t0), the altitude h may be calculated by interpolating altitude values of neighboring altitude points using bilinear interpolation or the like.

(Projecting Unit 270)

The projecting unit 270 calculates the display target area based on the car positional information received from the positional information accepting unit 255. The projecting unit 270 then perspective-projects the image information included in the display target area onto each virtual screen which is represented by a different one of the surfaces output from the surface generating unit 250, by using the coordinate information changed by the map deforming unit 261. The details are explained below.

The projecting unit 270 calculates the display target area and the transformation f, as in the fourth embodiment.

The projecting unit 270 notifies the map deforming unit 261 of the display target area, and instructs the map deforming unit 261 to add altitudes according to the altitude information to the first coordinate information showing the position of each pixel of the image information included in the display target area. The projecting unit 270 then acquires the coordinate information ((s0,t0),ah) to which the altitudes have been added, from the map deforming unit 261.

The projecting unit 270 coordinate-transforms the first and second elements of the coordinate information ((s0,t0), ah) using the transformation f, to calculate a position (f(s0, t0),ah) in the virtual space. The projecting unit 270 further calculates second coordinate information showing a point where the line of sight directed to the calculated position intersects with the virtual screen, and perspective-projects the image information based on the position shown by the second coordinate information.

(Map Display Operation)

Figure 37:
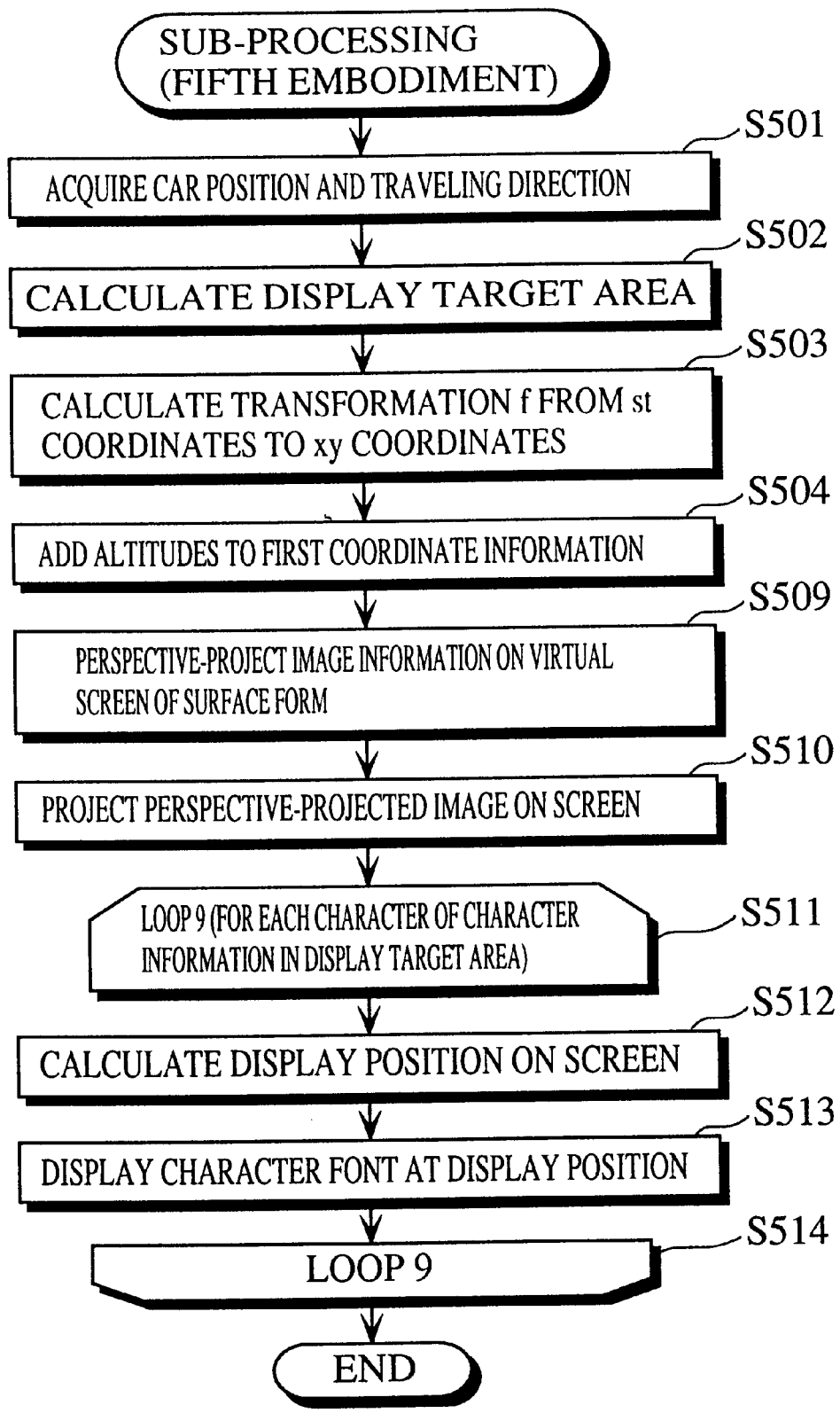
FIG. 37 is a flowchart showing sub-processing in the fifth embodiment.

A map display operation of the map display device 50 is explained below, with reference to FIG. 37.

The map display device 50 performs main processing and sub-processing, to display a map which gradually changes from one shape to another. In the main processing, surfaces are generated by gradually changing a shape of a surface to another shape, in accordance with the driver's operation. The sub-processing is called for each generated surface defined by corresponding surface definition information. In the sub-processing, after a map is deformed according to altitude information, the map is perspective-projected onto the surface defined by the surface definition information.

The main processing is the same as that in the first embodiment, so that its explanation is omitted here.

In the sub-processing, the positional information accepting unit 255 outputs the car positional information showing the car position and the traveling direction, to the projecting unit 270 (S501). The projecting unit 270 calculates the display target area based on the car position and the traveling direction (S502), and calculates the transformation f from st coordinates to xy coordinates of the virtual space (S503).

The map deforming unit 261 adds altitude values corresponding to the altitude information, to the first coordinate information showing the position of each pixel of the image information included in the display target area (S504).

For the coordinate information to which the altitude values have been added, the projecting unit 270 calculates second coordinate information showing a position on a virtual screen defined by the surface definition information. The projecting unit 270 perspective-projects the image information based on the position shown by the second coordinate information (S509)

The displaying unit 280 projects and displays the perspective-projected image, on the display screen equipped therein (S510). Also, for each character string included in the display target area (S511), the displaying unit 280 calculates a display position on the display screen (S512), and displays character fonts of the character string at the display position (S513).

(Conclusion)

As described above, the map display device 50 generates surfaces, by gradually changing a shape of a surface to a shape that corresponds to a position of a point of interest designated by the driver on a map. Here, the surfaces are made up of curved surfaces having intermediate shapes between the former and latter shapes, and a surface having the latter shape. The map display device 50 provides undulations corresponding to altitudes to image information, perspective-projects the image information provided with the undulations onto each virtual screen expressed by a different one of the surfaces, and projects the perspective-projected images onto the display screen. As a result, the map in which a desired portion is gradually enlarged or contracted while maintaining connection of roads can be displayed, with a three-dimensional appearance.

Also, the map display device 50 keeps the display of character fonts from being spoiled by perspective projection, in the same manner as in the first embodiment.

Sixth Embodiment

The following is a description of a map display device 60 which is the sixth embodiment of the invention. The map display device 60 generates surfaces, by gradually changing a shape of a surface to an intended shape that corresponds to a position of a point of interest designated by a driver on a map. The map display device 60 provides undulations corresponding to altitudes to coordinate information showing the map, except a car position and its vicinity. The map display device 60 then perspective-projects the resulting coordinate information onto each virtual screen expressed by a different one of the generated surfaces, and projects the perspective-projected images on a display screen. In so doing, the map is displayed that has a desired portion gradually enlarged or contracted while maintaining connections of roads, with a three-dimensional appearance. The map display device 60 also prevents the map display around the car position from being obstructed by undulations. The same features as the first, third, and fifth embodiments are omitted, so that the following explanation focuses on the differences with these embodiments.

(Overall Construction)

Figure 38:
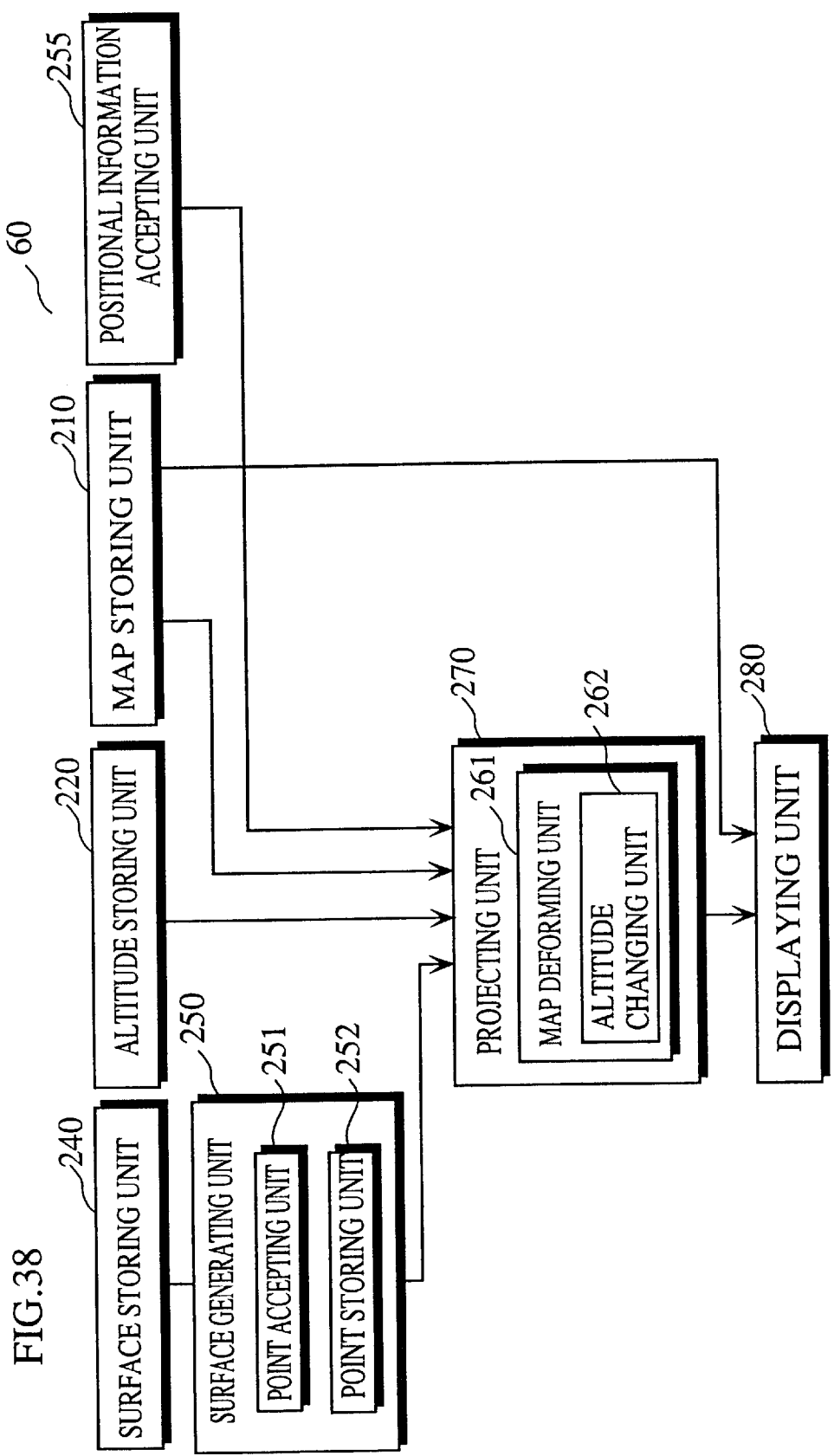
FIG. 38 is a block diagram showing a map display device according to the sixth embodiment of the invention.

As shown in FIG. 38, the map deforming unit 261 includes an altitude changing unit 262, in the map display device 60 of the sixth embodiment.

(Map Deforming Unit 261)

The map deforming unit 261 is notified by the projecting unit 270 of the display target area. The map deforming unit 261 adds altitudes according to altitude information which has been changed by the altitude changing unit 262, to the first coordinate information showing the position of each pixel of the image information included in the display target area. The map deforming unit 261 outputs the result to the projecting unit 270.

(Altitude Changing Unit 262)

The altitude changing unit 262 is the same as the altitude changing unit 162 in the third embodiment. The altitude changing unit 262 sets a flat area which contains the car position and its vicinity, changes altitudes of altitudes points in the flat area to a uniform value, and changes altitudes of altitude points around the flat area according to their distances from the flat area.

(Map Display Operation)

Figure 39:
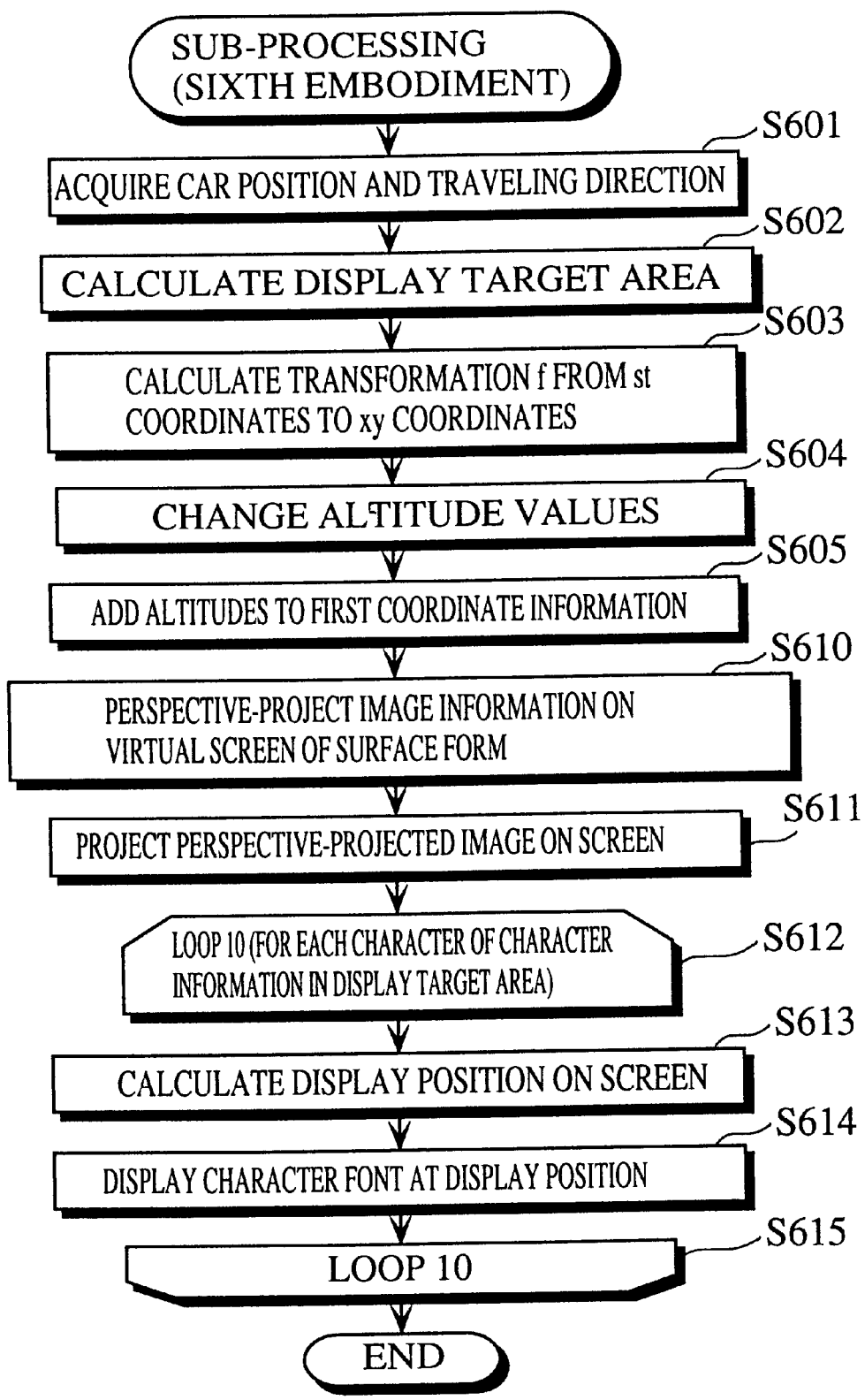
FIG. 39 is a flowchart showing sub-processing in the sixth embodiment.

A map display operation of the map display device 60 is explained below, with reference to FIG. 39.

The map display device 60 performs main processing and sub-processing, to display a map which gradually changes from one shape to another. In the main processing, surfaces are generated by gradually changing a shape of a surface to another shape, according to the driver's operation. The sub-processing is called for each generated surface defined by corresponding surface definition information. In the sub-processing, after a map is deformed according to altitude information which has been altered so as to render an area containing the car position and its vicinity flat, the map is perspective-projected onto the surface defined by the surface definition information.

The main processing is the same as that in the first embodiment, so that its explanation is omitted here.

In the sub-processing, the positional information accepting unit 255 outputs the car positional information showing the car position and the traveling direction, to the projecting unit 270 (S601). The projecting unit 270 calculates the display target area based on the car position and the traveling direction (S602), and calculates the transformation f from st coordinates to xy coordinates of the virtual space (S603).

The altitude changing unit 262 changes the altitudes of the altitude points in the flat area to the uniform value, and changes the altitudes of the altitude points around the flat area depending on their distances from the flat area (S604).

The map deforming unit 261 adds the changed altitudes to the first coordinate information showing the position of each pixel of the image information included in the display target area (S605).

For the coordinate information to which the changed altitudes have been added, the projecting unit 270 calculates second coordinate information showing a position on a virtual screen defined by the surface definition information, and perspective-projects the image information onto the virtual screen based on the position shown by the second coordinate information (S610).

The displaying unit 280 projects and displays the perspective-projected image, on the display screen equipped therein (S611). Also, for each character string included in the display target area (S612), the displaying unit 280 calculates a display position on the display screen (S613), and displays character fonts of the character string at the display position (S614).

(Conclusion)

As described above, the map display device 60 sequentially generates surfaces, by gradually changing a shape of a surface to a shape that corresponds to a position of a point of interest designated by the driver on a map. Here, the surfaces are made up of curved surfaces having intermediate shapes between the former and latter shapes, and a surface having the latter shape. The map display device 60 provides undulations corresponding to altitudes to image information except the car position and its vicinity, perspective-projects the image information provided with the undulations onto each virtual screen represented by a different one of the generated surfaces, and projects and displays the perspective-projected images on the display screen. As a result, the map which has a desired portion gradually enlarged or contracted while maintaining connections of roads is displayed with a three-dimensional appearance. Also, since the display of undulations around the car position is restricted, the map display around the car position is kept from being obstructed by such undulations.

Furthermore, the map display device 60 keeps the display of character fonts from being ruined by perspective projection, as in the first embodiment.

Modifications

Though the present invention has been described based on the above embodiments, the invention should not be limited to such. For example, the following modifications are possible.

(1) The invention may apply to the methods used in the above embodiments. These methods may be realized by computer programs that are executed by computer systems. Such computer programs may be distributed as digital signals.

The invention may also be realized by a computer-readable recording medium, such as a floppy disk, a hard disk, a CD-ROM, an MO disk, a DVD, a DVD-ROM, a DVD-RAM, or a semiconductor memory, on which computer programs and/or digital signals mentioned above are recorded.

Computer programs or digital signals that achieve the invention may also be transmitted via a network, such as a telecommunication network, a wired or wireless communication network, or the Internet.

The invention can also be realized by a computer system that includes a microprocessor and a memory. In this case, a computer program can be stored in the memory, with the microprocessor operating in accordance with this computer program.

The computer programs and/or digital signals may be provided to an independent computer system by distributing a recording medium on which the computer programs and/or digital signals are recorded, or by transmitting the computer programs and/or digital signals via a network.

(2) Surfaces stored in the surface storing units 140 and 240 are not limited to the examples shown in the embodiments. Through the use of the above definition forms ② and ③, surfaces of more complex shapes can be defined.

By using these definition forms to define surfaces of intended shapes, greater effects than those attained by the embodied curved surfaces are achieved, as it becomes possible to enlarge/contract desired map portions more flexibly.

(3) The first and fourth embodiments show the example of curved surfaces output from the surface generating units 150 and 250 when the driver, who has designated a point of interest located at the lower part of the display screen as the enlargement target, newly designates a point of interest located at the upper part of the display screen as the enlargement target. Here, if the same point of interest is designated repeatedly, the point of interest and its vicinity may be displayed with a larger scale.

To do so, the surface storing units 140 and 240 store two curved surfaces which enlarge the same map portion with different scaling factors. When the driver designates the same point of interest repeatedly, the surface generating units 150 and 250 sequentially generate curved surfaces by changing the shape of the curved surface with the lower scaling factor to the shape of the curved surface with the larger scaling factor.

(4) The first to sixth embodiments describe the case where character fonts of each character string are directly displayed at a predetermined position on the display screen, to keep the character fonts from being deformed by texture mapping and perspective projection. However, such a display method is not limited to character fonts. For example, when a map contains a landmark graphics indicating an object, the graphics may be directly displayed at a predetermined position on the display screen without being texture-mapped or perspective-projected. In this way, the deformation of the graphics is prevented, with it being possible to improve the viewability.

Although the present invention has been fully described by way of examples with reference to the accompanying drawings, it is to be noted that various changes and modifications will be apparent to those skilled in the art.

Therefore, unless such changes and modifications depart from the scope of the present invention, they should be construed as being included therein.

What is claimed is:

1. A map display method, comprising:
 a surface generating step for generating surfaces which are obtained in a process of gradually deforming a surface from a first shape to a second shape, the generated surfaces including (a) intermediate surfaces that each have an intermediate shape between the first shape and the second shape and (b) a surface that has the second shape;
 a mapping step for (a) transforming first coordinate information to second coordinate information on each of the generated surfaces, the first coordinate information showing positions of objects in a map, and (b) mapping graphics that represent the objects onto each of the generated surfaces with reference to positions shown by the second coordinate information, to obtain mapped images corresponding to the generated surfaces; and a projecting/displaying step for perspective-projecting the mapped images sequentially onto a flat virtual screen to obtain projected images, and displaying the projected images in sequence.

2. A map display method, comprising:

a surface generating step for generating surfaces which are obtained in a process of gradually deforming a surface from a first shape to a second shape, the generated surfaces including (a) intermediate surfaces that each have an intermediate shape between the first shape and the second shape and (b) a surface that has the second shape; and a projecting/displaying step for (a) transforming first coordinate information to second coordinate information on each of the generated surfaces, the first coordinate information showing positions of objects in a map, (b) perspective-projecting graphics that represent the objects onto each of the generated surfaces which serve as virtual screens with reference to positions shown by the second coordinate information, to obtain projected images corresponding to the generated surfaces, and (c) displaying the projected images in sequence.

3. A computer-readable program for realizing a map display method on a computer, comprising:

a surface generating step for generating surfaces which are obtained in a process of gradually deforming a surface from a first shape to a second shape, the generated surfaces including (a) intermediate surfaces that each have an intermediate shape between the first shape and the second shape and (b) a surface that has the second shape;

a mapping step for (a) transforming first coordinate information to second coordinate information on each of the generated surfaces, the first coordinate information showing positions of objects in a map, and (b) mapping graphics that represent the objects onto each of the generated surfaces with reference to positions shown by the second coordinate information, to obtain mapped images corresponding to the generated surfaces; and a projecting/displaying step for perspective-projecting the mapped images sequentially onto a flat virtual screen to obtain projected images, and displaying the projected images in sequence.

4. A computer-readable program for realizing a map display method on a computer, comprising:

a surface generating step for generating surfaces which are obtained in a process of gradually deforming a surface from a first shape to a second shape, the generated surfaces including (a) intermediate surfaces that each have an intermediate shape between the first shape and the second shape and (b) a surface that has the second shape; and a projecting/displaying step for (a) transforming first coordinate information to second coordinate information on each of the generated surfaces, the first coordinate information showing positions of objects in a map, (b) perspective-projecting graphics that represent the objects onto each of the generated surfaces which serve as virtual screens with reference to positions shown by the second coordinate information, to obtain projected images corresponding to the generated surfaces, and (c) displaying the projected images in sequence.

5. A map display device, comprising:

a map storing unit operable to store first coordinate information, the first coordinate information showing positions of objects in a map;

a surface generating unit operable to generate surfaces which are obtained in a process of gradually deforming a surface from a first shape to a second shape, the generated surfaces including (a) intermediate surfaces that each have an intermediate shape between the first shape and the second shape and (b) a surface that has the second shape;

a mapping unit operable to (a) transform the first coordinate information to second coordinate information on each of the generated surfaces, and (b) map graphics that represent the objects onto each of the generated surfaces with reference to positions shown by the second coordinate information, to obtain mapped images corresponding to the generated surfaces; and a projecting/displaying unit operable to perspective-project the mapped images sequentially onto a flat virtual screen to obtain projected images, and display the projected images in sequence.

6. The map display device of claim 5, wherein the first shape and the second shape are (a) a flat surface and a curved surface, (b) a curved surface and a flat surface, or (c) two curved surfaces.

7. The map display device of claim 5, wherein a portion of the map that includes a point of interest should be enlarged or contracted gradually with time, and the surface generating unit (a) generates, when the portion should be enlarged, the surfaces where the second shape is defined such that:

an angle formed between a part of the surface with the second shape to which graphics which represent objects included in the portion are texture-mapped and a line of sight directed to the part of the surface in the perspective projection is larger than any angles formed between other parts of the surface and lines of sight directed to the other parts of the surface in the perspective projection, and (b) generates, when the portion should be contracted, the surfaces where the second shape is defined such that:

an angle formed between a part of the surface with the second shape to which graphics which represent objects included in the portion are texture-mapped and a line of sight directed to the part of the surface in the perspective projection is smaller than any angles formed between other parts of the surface and lines of sight directed to the other parts of the surface in the perspective projection.

8. The map display device of claim 7, wherein the surface generating unit includes:

a point accepting unit for accepting an indication of a position of the point of interest and an indication regarding whether the portion including the point of interest should be enlarged or contracted, from a user, and the surface generating unit generates the surfaces in accordance with the accepted indications.

9. The map display device of claim 8, further comprising:

altitude storing unit for storing altitude information showing a correspondence between positions of points in the map and altitudes of the points, wherein the mapping unit includes:

a surface deforming unit for (a) transforming the positions shown by the altitude information to positions on each of the generated surfaces, and (b) providing undulations corresponding to the altitudes shown by the altitude information, to each of the generated surfaces at the transformed positions, to generate deformed surfaces, and the mapping unit transforms the first coordinate information to the second coordinate information on each of the deformed surfaces.

10. The map display device of claim 9, wherein the surface deforming unit includes:

an altitude changing unit for changing altitudes in the altitude information that correspond to positions which belong to a first area in the map, to a uniform value, the first area being made up of a current position of the map display device and a neighborhood thereof, and the surface deforming unit generates the deformed surfaces using the changed altitude information.

11. The map display device of claim 10, wherein the altitude changing unit further changes altitudes in the altitude information that correspond to positions which belong to an area around the first area in the map, in accordance with distances of the positions from the first area.

12. The map display device of claim 5, wherein when sequentially displaying the projected images, the projecting/displaying means also displays character strings that show the objects, with reference to display positions of, the graphics that represent the objects.

13. The map display device of claim 5, wherein the mapping performed by the mapping unit is texture mapping.

14. A map display device, comprising:

a map storing unit operable to store first coordinate information, the first coordinate information showing positions of objects in a map;

a surface generating unit operable to generate surfaces which are obtained in a process of gradually deforming a surface from a first shape to a second shape, the generated surfaces including (a) intermediate surfaces that each have an intermediate shape between the first shape and the second shape and (b) a surface that has the second shape; and a projecting/displaying unit operable to (a) transform the first coordinate information to second coordinate information on each of the generated surfaces, (b) perspective-project graphics that represent the objects onto each of the generated surfaces which serve as virtual screens with reference to positions shown by the second coordinate information, to obtain projected images corresponding to the generated surfaces, and (c) display the projected images in sequence.

15. The map display device of claim 14, wherein the first shape and the second shape are (a) a flat surface and a curved surface, (b) a curved surface and a flat surface, or (c) two curved surfaces.

16. The map display device of claim 14, wherein a portion of the map that includes a point of interest should be enlarged or contracted gradually with time, and the surface generating unit (a) generates, when the portion should be enlarged, the surfaces where the second shape is defined such that:

an angle formed between a part of the surface with the second shape to which graphics which represent objects included in the portion are perspective-projected and a line of sight directed to the part of the surface in the perspective projection is smaller than any angles formed between other parts of the surface and lines of sight directed to the other parts of the surface in the perspective projection, and (b) generates, when the portion should be contracted, the surfaces where the second shape is defined such that:

an angle formed between a part of the surface with the second shape to which graphics which represent objects included in the portion are perspective-projected and a line of sight directed to the part of the surface in the perspective projection is larger than any angles formed between other parts of the surface and lines of sight directed to the other parts of the surface in the perspective projection.

17. The map display device of claim 16, wherein the surface generating unit includes:

a point accepting unit for accepting an indication of a position of the point of interest and an indication regarding whether the portion including the point of interest should be enlarged or contracted, from a user, and the surface generating means generates the surfaces in accordance with the accepted indications.

18. The map display device of claim 17, further comprising:

altitude storing unit for storing altitude information showing a correspondence between positions of points in the map and altitudes of the points, wherein the projecting/displaying unit includes:

a map deforming unit for (a) calculating altitudes at the positions shown by the first coordinate information, based on the altitude information, and (b) changing the first coordinate information according to the calculated altitudes, and the projecting/displaying unit transforms the changed first coordinate information to the second coordinate information on each of the generated surfaces.

19. The map display device of claim 18, wherein the map deforming unit includes:

an altitude changing unit for changing altitudes shown by the altitude information that correspond to positions which belong to a first area in the map, to a uniform value, the first area being made up of a current position of the map display device and a neighborhood thereof, and the map deforming unit changes the first coordinate information in accordance with the changed altitude information.

20. The map display device of claim 19, wherein the altitude changing unit further changes altitudes shown by the altitude information that correspond to positions which belong to an area around the first area in the map, in accordance with distances of the positions from the first area.

21. The map display device of claim 14, wherein when sequentially displaying the projected images, the projecting/displaying unit also displays character strings that show the objects, with reference to display positions of the graphics that represent the objects.

* * * * *